United States Patent
Murao et al.

(10) Patent No.: US 7,427,446 B2
(45) Date of Patent: Sep. 23, 2008

(54) MAGNETIC RECORDING MEDIUM WITH ANTIPARALLEL MAGNETIC LAYERS AND CRN BASED UNDERLAYER, MAGNETIC STORAGE APPARATUS AND METHOD OF PRODUCING MAGNETIC RECORDING MEDIUM

(75) Inventors: Reiko Murao, Higashine (JP); Masaya Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 11/049,451

(22) Filed: Feb. 2, 2005

(65) Prior Publication Data

US 2005/0191524 A1    Sep. 1, 2005

Related U.S. Application Data

(63) Continuation-in-part of application No. 10/925,718, filed on Aug. 25, 2004, now Pat. No. 7,141,272.

(30) Foreign Application Priority Data

Feb. 2, 2004    (JP) ............... 2004-025562
Jan. 21, 2005    (JP) ............... 2005-013533

(51) Int. Cl.
    *G11B 5/66*    (2006.01)
(52) U.S. Cl. ............ 428/831.2; 428/828; 428/832.2; 360/131
(58) Field of Classification Search ............ None
    See application file for complete search history.

(56) References Cited

U.S. PATENT DOCUMENTS 5,698,312 A    12/1997 Kashiwaya
5,968,679 A    10/1999 Kobayashi et al.
6,174,582 B1 *    1/2001 Bian et al. ............ 428/831.2
6,537,684 B1    3/2003 Doerner et al.

(Continued)

FOREIGN PATENT DOCUMENTS

CN    1446354 A    10/2003

(Continued)

OTHER PUBLICATIONS

Yu, et al.; High-Density Longitudinal Recording Media with CrMoB Underlayer; IEEE Trans. on Magnetics, vol. 39, No. 5, pp. 2261-2263; Sep. 2003.

(Continued)

*Primary Examiner*—Kevin M Bernatz
(74) *Attorney, Agent, or Firm*—Greer, Burns & Crain, Ltd.

(57) ABSTRACT

A magnetic recording medium including a substrate, a first underlayer provided on the substrate, a first magnetic layer provided on the first underlayer, a nonmagnetic coupling layer provided on the first magnetic layer, and a second magnetic layer provided on the nonmagnetic coupling layer. The first and second magnetic layers are exchange-coupled, and have magnetizations that are mutually antiparallel in a state where no external field is applied to the magnetic recording medium. Additionally, the first underlayer is made of Cr or a Cr alloy each having a bcc crystal structure and including nitrogen, and further wherein the first underlayer has a thickness in a range of 0.5 nm to 6.0 nm.

24 Claims, 14 Drawing Sheets

U.S. PATENT DOCUMENTS

| | | |
|---|---|---|
| 6,602,612 B2 | 8/2003 | Abarra et al. .............. 428/611 |
| 6,645,646 B1 | 11/2003 | Umeda et al. ............. 428/694 |
| 6,689,495 B1 | 2/2004 | Sato et al. ................. 428/694 |
| 6,761,982 B2 | 7/2004 | Sakawaki et al. |
| 6,787,251 B1 | 9/2004 | Wu et al. |
| 6,803,117 B2 * | 10/2004 | Akimoto et al. ............ 428/828 |
| 6,808,830 B2 | 10/2004 | Sakawaki et al. |
| 6,830,837 B2 | 12/2004 | Kanbe et al. |
| 6,964,819 B1 * | 11/2005 | Girt et al. ................... 428/828 |
| 2002/0037440 A1 | 3/2002 | Ono et al. |
| 2002/0037441 A1 * | 3/2002 | Okuyama et al. ...... 428/694 TS |
| 2002/0055017 A1 * | 5/2002 | Fukushima et al. ... 428/694 SG |
| 2003/0082410 A1 | 5/2003 | Sato et al. .................. 428/694 |
| 2003/0124390 A1 | 7/2003 | Abarra et al. .............. 428/694 |
| 2003/0180577 A1 | 9/2003 | Do et al. |
| 2004/0121185 A1 | 6/2004 | Fukuzawa et al. |
| 2005/0084716 A1 | 4/2005 | Kanbe et al. |
| 2005/0142390 A1 * | 6/2005 | Ajan et al. ............. 428/694 TS |

FOREIGN PATENT DOCUMENTS

| | | |
|---|---|---|
| JP | 64-59627 A | 3/1989 |
| JP | 10-255225 | 9/1998 |
| JP | 11-31632 A | 11/1999 |
| JP | 2000067423 | 3/2000 |
| JP | 2001-056924 | 2/2001 |
| JP | 2002260208 | 9/2002 |
| JP | 2003085727 | 3/2003 |

OTHER PUBLICATIONS

Laughlin, D.E. et al, "The Crystallography and Texture of Co-based Thin Film Deposited on Cr Underlayers"; IEEE Transactions on Magnetics, vol. 27, Issue 6, Part 2; Nov. 1991, pp. 4713-4717.

Lal, B.B. et al., "Coercivity-Gradient Bi-Layered Thin-Film Media for Longitudinal Recording"; IEEE Transactions on Magnetics, vol. 30, Issue 6, Part 1-2; Nov. 1994, pp. 3981-3983.

* cited by examiner

FIG.2

| | 1ST UNDERLAYER | | 2ND UNDERLAYER | COERCIVITY | COERCIVITY SQUARENESS RATIO | RESOLUTION |
|---|---|---|---|---|---|---|
| | COMPOSITION | AMOUNT OF ADDED $N_2$ (vol.%) | COMPOSITION | (kA/m) | | (%) |
| EMBODIMENT I | Cr(N) | 0.10 | $Cr_{75}$–$Mo_{25}$ | 327.0 | 0.78 | 50.0 |
| COMPARISON EXAMPLE C1 | Cr | 0.00 | $Cr_{75}$–$Mo_{25}$ | 325.9 | 0.73 | 49.0 |
| EMBODIMENT II | Cr(N) | 0.10 | $Cr_{80}$–$Mo_{20}$ | 329.2 | 0.77 | 50.4 |
| COMPARISON EXAMPLE C2 | Cr | 0.00 | $Cr_{80}$–$Mo_{20}$ | 329.7 | 0.72 | 50.0 |
| EMBODIMENT III | Cr(N) | 0.10 | $Cr_{65}$–$Mo_{35}$ | 331.6 | 0.77 | 50.3 |
| COMPARISON EXAMPLE C3 | Cr | 0.00 | $Cr_{65}$–$Mo_{35}$ | 333.6 | 0.72 | 49.9 |
| EMBODIMENT IV | Cr(N) | 0.10 | $Cr_{92.5}$–$W_{7.5}$ | 329.1 | 0.75 | 54.0 |
| COMPARISON EXAMPLE C4 | Cr | 0.00 | $Cr_{92.5}$–$W_{7.5}$ | 320.0 | 0.66 | 51.9 |
| EMBODIMENT V | $Cr_{95}$–$Mo_5$(N) | 0.10 | $Cr_{75}$–$Mo_{25}$ | 328.6 | 0.77 | 50.1 |
| COMPARISON EXAMPLE C5 | $Cr_{95}$–$Mo_5$ | 0.00 | $Cr_{75}$–$Mo_{25}$ | 332.4 | 0.72 | 49.5 |
| EMBODIMENT VI | $Cr_{90}$–$Mo_{10}$(N) | 0.10 | $Cr_{75}$–$Mo_{25}$ | 326.1 | 0.77 | 50.3 |
| COMPARISON EXAMPLE C6 | $Cr_{90}$–$Mo_{10}$ | 0.00 | $Cr_{75}$–$Mo_{25}$ | 330.9 | 0.71 | 49.3 |

MAGNETIC RECORDING MEDIUM WITH ANTIPARALLEL MAGNETIC LAYERS AND CRN BASED UNDERLAYER, MAGNETIC STORAGE APPARATUS AND METHOD OF PRODUCING MAGNETIC RECORDING MEDIUM

This application is a Continuation-In-Part Application of a U.S. patent application Ser. No. 10/925,718 filed Aug. 25, 2004 now U.S. Pat. No. 7,141,272.

This application claims the benefit of a Japanese Patent Application No. 2004-025562 filed Feb. 2, 2004 and a Japanese Patent Application No. 2005-013533 filed Jan. 21, 2005, in the Japanese Patent Office, the disclosures of which are hereby incorporated by reference.

BACKGROUND OF THE INVENTION

1. Field of the Invention

The present invention generally relates to magnetic recording media suited for high-density recording, magnetic storage apparatuses using such magnetic recording media and methods of producing such magnetic recording media, and more particularly to a magnetic recording medium which has a recording layer formed by two magnetic layers which are antiferromagnetically exchange-coupled, a magnetic storage apparatus using such a magnetic recording medium and a method of producing such a magnetic recording medium.

2. Description of the Related Art

Recently, the recording densities of magnetic recording media have increased dramatically, even at a rate reaching 100% per year. However, in the popularly employed longitudinal (or in-plane) recording system, it is expected that a limit of the longitudinal recording density will be on the order of 100 Gb/in$^2$ to 200 Gb/in$^2$, because the medium noise will increase and the output will decrease in the high-density recording region, thereby deteriorating the signal-to-noise (S/N) ratio. In addition, in the longitudinal recording system, the thermal stability of the magnetic recording medium becomes a problem due to the self-diamagnetic field with respect to written bits and the diamagnetic field from the adjacent bits which increase for the high-density recording.

In order to reduce the medium noise in the high-density recording region, it is necessary to reduce the size of the magnetic grains, that is, the crystal grains forming the recording layer, and to reduce the magnetic interaction between the magnetic grains. When the size of crystal grain forming the magnetization unit is reduced, it is possible to reduce the zigzag of the boundary between the magnetization units, that is, the magnetization transition region. There are several known methods of reducing the crystal grain size, such as adding Ta, Nb, B, P and the like to a CoCr alloy forming the recording layer. Moreover, there is a known method which reduces the size of the crystal grains forming an underlayer of the recording layer so as to reduce the size of the magnetic grains grown epitaxially on it, Yu et al., "High-Density Longitudinal Recording Media With CrMoB Underlayer", IEEE Trans. Magn., vol. 39, No. 5, September 2003, pp. 2261-2263 proposes reducing the thickness of the underlayer and adding B to the underlayer in order to reduce the crystal grain size of the underlayer.

Furthermore, as a method of reducing the magnetic interaction between the magnetic grains, it is known to be effective to increase the Cr-content or B-content of the CoCr alloy forming the recording layer, so as to promote segregation and isolate the magnetic grains by the grain boundaries between the formed magnetic grains.

On the other hand, in the longitudinal magnetic recording medium, it is known that an isolated wave peak width at half-value PW50 of the reproduced output waveform can be described by the following formula (1) of relationships of static magnetic characteristics of the magnetic recording medium, where Hc denotes a coercivity, Mr denotes a remanent magnetization, t denotes a thickness of the recording layer, a is proportional to $(t \times Mr/Hc)^{1/2}$, and d denotes a magnetic spacing.

$$PW50 = [2(a+d)^2 + (a/2)^2]^{1/2} \qquad (1)$$

It may be seen from the formula (1) that in order to reduce the isolated wave peak width at half-value PW50, the coercivity Hc should be increased and the thickness t should be reduced. Since the resolution of the reproduced signal improves as the isolated wave peak width at half-value PW50 becomes smaller, it is desirable to make the thickness t of the recording layer small and to make the coercivity Hc of the recording layer high, in order to realize the high-density recording.

However, when the reduction of the magnetic grain size and the reduction of the magnetic interaction are promoted, the diamagnetic field increases as the recording density increases, thereby making the problem of the thermal stability even more serious. As a countermeasure, an anisotropic field Hk of the recording layer is conventionally increased. But when the anisotropic field Hk is increased, it becomes more difficult to record information on the recording layer. Consequently, the recording magnetic field needs to be increased, and it becomes essential to develop a magnetic pole material having a high saturation magnetic flux density for the recording head element. The development of the magnetic pole material must not only satisfy the high saturation magnetic flux density, but must also simultaneously satisfy various required characteristics, thereby making the development extremely difficult.

A Japanese Laid-Open Patent Application No. 2001-056924 proposes a magnetic recording medium which simultaneously realizes reduced medium noise and thermal stability. This so-called Synthetic Ferrimagnetic Medium (SFM) has a recording layer that is formed by two antiferromagnetically exchange-coupled magnetic layers. In the SFM, the volume of the magnetic grains substantially becomes a sum of volumes of the magnetic grains of the two antiferromagnetically exchange-coupled magnetic layers. For this reason, the thermal stability is greatly improved, and the magnetic grain size can be reduced. As a result, the SFM can realize improved thermal stability, reduced medium noise and high S/N ratio.

However, when the thickness of the magnetic layer of the SFM is reduced as described above in order to improve the resolution, a coercivity squareness ratio decreases to thereby deteriorate the resolution instead of improving the resolution. In addition, a ratio Siso/Nm of an isolated wave average signal output Siso and a medium noise Nm, and a ratio S/Nm of an average output S at a maximum recording density used and the medium noise Nm, deteriorate.

Moreover, in a case where an exchange coupling energy acting between the two magnetic layers is excessively large, the thermal stability improves, but recording characteristics such as an overwrite performance and a Non-Linear Transition Shift (NLTS) deteriorate. Although there is a method of increasing the recording magnetic field to suppress the deterioration of the recording characteristics, it is difficult to increase the recording magnetic field as described above.

SUMMARY OF THE INVENTION

Accordingly, it is a general object of the present invention to provide a novel and useful magnetic recording medium, magnetic storage apparatus and method of producing magnetic recording medium, in which the problems described above are suppressed.

Another and more specific object of the present invention is to provide a magnetic recording medium having improved resolution, good recording characteristics such as an overwrite performance, a high S/N ratio and good thermal stability, a magnetic storage apparatus using such a magnetic recording medium, and a method of producing such a magnetic recording medium.

Still another object of the present invention is to provide a method of producing a magnetic recording medium comprising the steps of (a) forming a first underlayer on a base; and (b) successively forming, on the first underlayer, a first magnetic layer, a nonmagnetic coupling layer and a second magnetic layer, where the first and second magnetic layers are exchange-coupled via the nonmagnetic coupling layer and have antiparallel magnetizations in a state where no external magnetic field is applied on the magnetic recording medium, and the step (a) forms the first underlayer from Cr or a Cr alloy having a bcc crystal structure within an atmosphere including nitrogen gas. According to the method of the present invention, it is possible to increase a coercivity squareness ratio and improve a resolution and an overwrite performance of the magnetic recording medium. As a result, it is possible to realize a magnetic recording medium having high thermal stability and S/N ratio. In other words, since exchange coupling fields between the first and second magnetic layers decrease when the first underlayer is formed within the atmosphere including the nitrogen gas, the magnetizations of the first and second magnetic layers are more easily switched in response to a switching of a recording magnetic field that is applied on the magnetic recording medium from a magnetic head.

The method of producing the magnetic recording medium may further comprise the step of (c) forming a second underlayer between the first underlayer and the first magnetic layer, where the step (c) forms the second underlayer from Cr or a Cr alloy having a bcc crystal structure within an atmosphere including an amount of nitrogen gas that is 0.1 vol. % or less. In this case, it is possible to increase the coercivity squareness ratio and improve the S/N ratio.

The step (a) may add an amount of nitrogen gas in a range of 0.01 vol. % or greater and 0.50 vol. % or less, and the step (c) may use an inert gas atmosphere including at least one element selected from a group consisting of He, Ne, Ar, Kr and Xe. In this case, it is possible to greatly increase the coercivity squareness ratio, and improve the resolution, the overwrite performance and the S/N ratio. The addition of nitrogen gas into the gas atmosphere results in the formation of the first underlayer having good crystal grain size and crystal grain size distribution, and the formation of the second underlayer within the inert gas atmosphere results in the second underlayer which inherits the good crystal grain size and crystal grain size distribution of the first underlayer, in addition to the good crystallinity of the second underlayer itself. Consequently, the coercivity squareness ratio is increased.

The steps (a) and (c) may use a Cr alloy that includes at least one added element selected from a group consisting of Mo, W, V and Ti so that the added elements are identical for the first and second underlayers, and each added element has an amount in at. % greater in the second underlayer than in the first underlayer. In this case, the lattice spacing of the added elements gradually increases from the first underlayer to the second underlayer, so that the lattice matching with a Co-based alloy such as CoCrPt used for the first and second magnetic layers improves, to thereby improve the in-plane orientation and the crystallinity of the first and second magnetic layers.

A further object of the present invention is to provide a magnetic recording medium comprising a substrate; a first underlayer provided on the substrate; a first magnetic layer provided on the first underlayer; a nonmagnetic coupling layer provided on the first magnetic layer; and a second magnetic layer provided on the nonmagnetic coupling layer, wherein the first and second magnetic layers are exchange-coupled, and have magnetizations that are mutually antiparallel in a state where no external field is applied to the magnetic recording medium, and the first underlayer is made of Cr or a Cr alloy having a bcc crystal structure and including nitrogen. According to the magnetic recording medium of the present invention, it is possible to improve the coercivity squareness ratio, resolution, overwrite performance, S/N ratio and thermal stability.

Another object of the present invention is to provide a magnetic recording medium comprising a substrate; a first underlayer provided on the substrate; a second underlayer provided on the first underlayer; a first magnetic layer provided on the second underlayer; a nonmagnetic coupling layer provided on the first magnetic layer; and a second magnetic layer provided on the nonmagnetic coupling layer, wherein the first and second magnetic layers are exchange-coupled, and have magnetizations that are mutually antiparallel in a state where no external field is applied to the magnetic recording medium, the first underlayer is made of Cr or a Cr alloy having a bcc crystal structure and including nitrogen, the second underlayer is made of is made of Cr or a Cr alloy having a bcc crystal structure or, Cr or a Cr alloy including nitrogen, and the first underlayer has a nitrogen content larger than that of the second underlayer. According to the magnetic recording medium of the present invention, it is possible to improve the coercivity squareness ratio, resolution, overwrite performance, S/N ratio and thermal stability.

Still another object of the present invention is to provide a magnetic disk comprising a substrate; a seed layer, provided on the substrate, and made of a material selected from a group consisting of AlRu, NiAl and FeAl; a first underlayer, provided on the seed layer, and made of Cr or a Cr alloy having a bcc crystal structure formed in a gas atmosphere including nitrogen gas in a range of 0.01 vol. % to 0.50 vol. %; a second underlayer, provided on the first underlayer, and made of Cr or a Cr alloy having a bcc crystal structure formed in a gas atmosphere including nitrogen gas in a range of 0.00 vol. % to 0.10 vol. %; a first magnetic layer provided on the second underlayer; a nonmagnetic coupling layer provided on the first magnetic layer; and a second magnetic layer provided on the nonmagnetic coupling layer, wherein the first and second magnetic layers are exchange-coupled, and have magnetizations that are mutually antiparallel in a state where no external field is applied to the magnetic recording medium. According to the magnetic disk of the present invention, it is possible to improve the coercivity squareness ratio, resolution, overwrite performance, S/N ratio and thermal stability.

A further object of the present invention is to provide a magnetic storage apparatus comprising at least one magnetic recording medium; and a head configured to record information on and to reproduce information from the magnetic recording medium, where the magnetic recording medium comprises a substrate; a first underlayer provided on the substrate; a first magnetic layer provided on the first underlayer; a nonmagnetic coupling layer provided on the first magnetic layer; and a second magnetic layer provided on the nonmagnetic coupling layer, wherein the first and second magnetic layers are exchange-coupled, and have magnetizations that are mutually antiparallel in a state where no external field is applied to the magnetic recording medium, and the first underlayer is made of Cr or a Cr alloy having a bcc crystal structure and including nitrogen. According to the magnetic storage apparatus of the present invention, it is possible to improve the S/N ratio and the thermal stability due to the improved coercivity squareness ratio, resolution, overwrite performance, S/N ratio and thermal stability of the magnetic recording medium.

Another object of the present invention is to provide a magnetic storage apparatus comprising at least one magnetic recording medium; and a head configured to record information on and to reproduce information from the magnetic recording medium, where the magnetic recording medium comprises a substrate; a first underlayer provided on the substrate; a second underlayer provided on the first underlayer; a first magnetic layer provided on the second underlayer; a nonmagnetic coupling layer provided on the first magnetic layer; and a second magnetic layer provided on the nonmagnetic coupling layer, wherein the first and second magnetic layers are exchange-coupled, and have magnetizations that are mutually antiparallel in a state where no external field is applied to the magnetic recording medium, the first underlayer is made of Cr or a Cr alloy having a bcc crystal structure and including nitrogen, the second underlayer is made of is made of Cr or a Cr alloy having a bcc crystal structure or, Cr or a Cr alloy including nitrogen, and the first underlayer has a nitrogen content larger than that of the second underlayer. According to the magnetic storage apparatus of the present invention, it is possible to improve the S/N ratio and the thermal stability due to the improved coercivity squareness ratio, resolution, overwrite performance, S/N ratio and thermal stability of the magnetic recording medium.

Still another object of the present invention is to provide a magnetic storage apparatus comprising at least one magnetic disk; and a head configured to record information on and to reproduce information from the magnetic disk, where the magnetic disk comprises a substrate; a seed layer, provided on the substrate, and made of a material selected from a group consisting of AlRu, NiAl and FeAl; a first underlayer, provided on the seed layer, and made of Cr or a Cr alloy having a bcc crystal structure formed in a gas atmosphere including nitrogen gas in a range of 0.01 vol. % to 0.50 vol. %; a second underlayer, provided on the first underlayer, and made of Cr or a Cr alloy having a bcc crystal structure formed in a gas atmosphere including nitrogen gas in a range of 0.00 vol. % to 0.10 vol. %; a first magnetic layer provided on the second underlayer; a nonmagnetic coupling layer provided on the first magnetic layer; and a second magnetic layer provided on the nonmagnetic coupling layer, wherein the first and second magnetic layers are exchange-coupled, and have magnetizations that are mutually antiparallel in a state where no external field is applied to the magnetic disk. According to the magnetic storage apparatus of the present invention, it is possible to improve the S/N ratio and the thermal stability due to the improved coercivity squareness ratio, resolution, overwrite performance, S/N ratio and thermal stability of the magnetic disk.

Other objects and further features of the present invention will be apparent from the following detailed description when read in conjunction with the accompanying drawings.

BRIEF DESCRIPTION OF THE DRAWINGS

FIG. 2 is a diagram showing structures and characteristics of first and second underlayers of magnetic disks in accordance with embodiments of the present invention and magnetic disks in accordance with a comparison examples;

DESCRIPTION OF THE PREFERRED EMBODIMENTS

Figure 1:
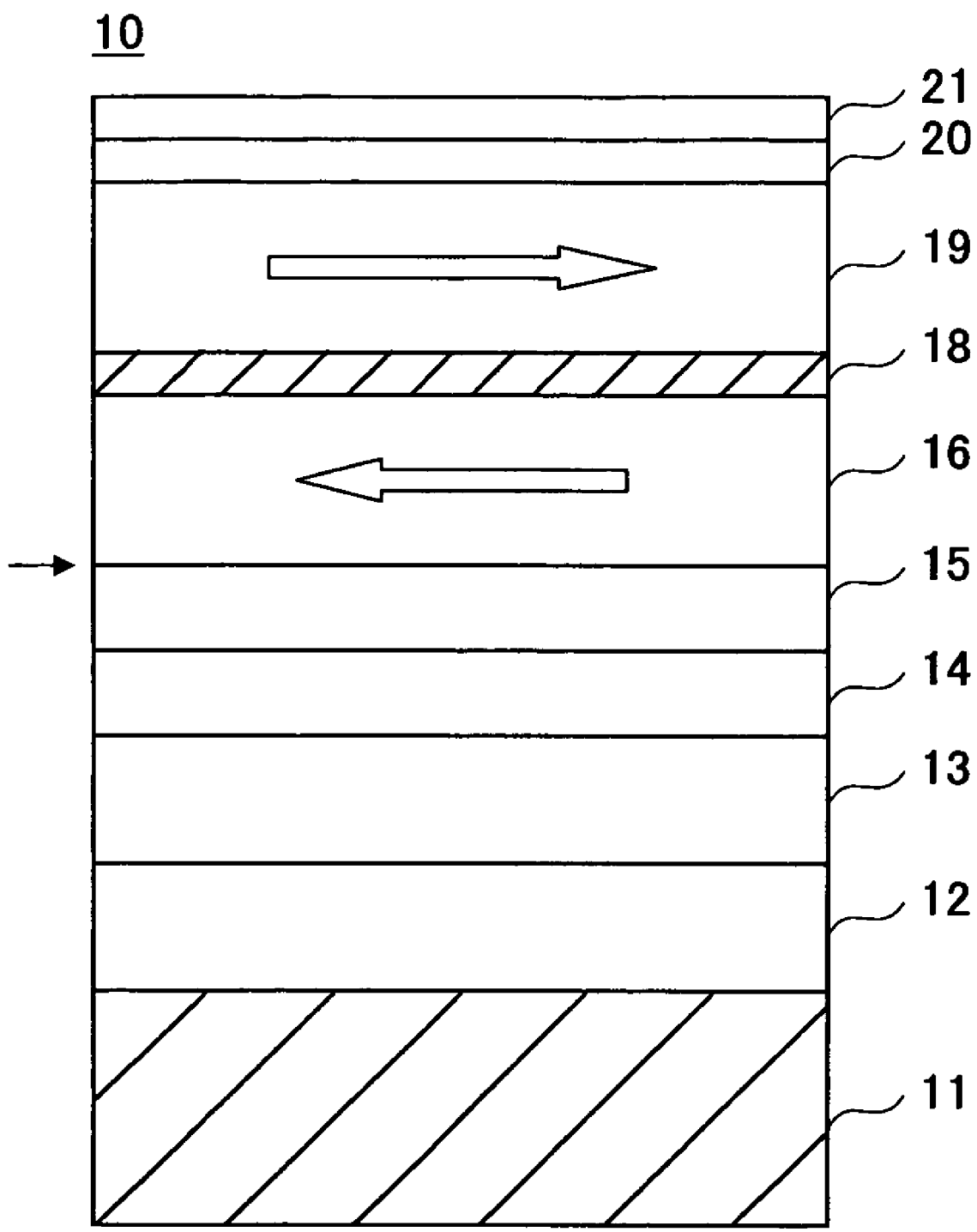
FIG. 1 is a cross sectional view showing a magnetic recording medium produced by a method of producing magnetic recording medium according to the present invention.

FIG. 1 is a cross sectional view showing a magnetic recording medium produced by a method of producing magnetic recording medium according to the present invention. As will be described later, a magnetic recording medium 10 shown in FIG. 1 forms a first embodiment of a magnetic recording medium according to the present invention. The magnetic recording medium 10 has a substrate 11, and a first seed layer 12, a second seed layer 13, a first underlayer 14, a second underlayer 15, a first magnetic layer 16, a nonmagnetic coupling layer 18, a second magnetic layer 19, a protection layer 20 and a lubricant layer 21 which are successively stacked on the substrate 11. This magnetic recording medium 10 has an exchange-coupled structure in which the first magnetic layer 16 and the second magnetic layer 19 are antiferromagnetically exchange-coupled via the nonmagnetic coupling layer 18. In a state where no external magnetic field is applied on the magnetic recording medium 10, the remanent magnetizations of the first magnetic layer 16 and the second magnetic layer 19 are mutually antiparallel. A described will hereunder be given with respect to the particular structure of the magnetic recording medium 10 and a method of producing the magnetic recording medium 10.

The substrate 11 may be formed by a disk-shaped plastic substrate, glass substrate, NiP-plated Al alloy substrate, Si substrate and the like, for example. The substrate 11 may also be formed by tape-shaped plastic films made of PET, PEN, polyimide and the like. The substrate 11 may or may not be textured. In a case where the magnetic recording medium 10 is a magnetic disk, a texturing process is carried out in a circumferential direction of the magnetic disk, that is, in a direction in which a track on the magnetic disk extends.

Prior to forming the first seed layer 12, the substrate 11 is heated to 180° C., for example, under vacuum or within an inert gas atmosphere. As a result, it is possible to remove organic materials, moisture and the like adhered on the surface of the substrate 11, and promote crystal growth of each of the layers from the first seed layer 12 up to the second magnetic layer 19 which is formed on the substrate 11. In addition, when forming each of the layers from the first seed layer 12 up to the second magnetic layer 19 on the substrate 11, the substrate 11 may be heated under vacuum if necessary. In this case, it is possible to promote crystal growth and promote Cr segregation within the first magnetic layer 16 and the second magnetic layer 19.

Unless otherwise indicated in the following description, each of the layers from the first seed layer 12 up to the second magnetic layer 19 is formed within an inert gas atmosphere by setting a pressure to 0.67 Pa, for example.

The first seed layer 12 may be formed by sputtering, vacuum deposition, plating and the like. The first seed layer 12 may be made of a nonmagnetic amorphous metal such as NiP, CoW, AlTi and CrTi. The first seed layer 12 may or may not be textured. In a case where the first seed layer 12 is made of an amorphous metal such as NiP and CoW, the first seed layer 12 is preferably oxidized, so that an in-plane orientation of the c-axis improves for the first magnetic layer 16 and the second magnetic layer 19. Of course, a known material which improves the c-axis orientation may be used for the first seed layer 12 in place of NiP.

The second seed layer 13 may be formed by sputtering, vacuum deposition and the like. The second seed layer 13 may be made of an amorphous material such as NiP, CoW and CrTi, or an alloy having a B2 structure such as AlRu, NiAl and FeAl. In a case where the second seed layer 13 is made of the amorphous metal, the amorphous metal may include oxygen or nitrogen, and this second seed layer 13 may be formed within a gas atmosphere including oxygen gas or nitrogen gas using a amorphous metal material. The second seed layer 13 may include oxygen or nitrogen only in a vicinity of the surface thereof, and this second seed layer 13 may be formed by forming an amorphous metal material within an inert gas atmosphere and subjecting the surface of the formed amorphous metal material to an oxidation process or a nitriding process. The preferred orientation of the (200) or the (112) texture of the first underlayer 14 formed on such second seed layers 13 is improved.

The second seed layer 13 may or may not be textured. In a case where the magnetic recording medium 10 is the magnetic disk, the texturing process is carried out in the circumferential direction of the magnetic disk, that is, in the direction in which the track on the magnetic disk extends.

The first underlayer 14 may be made of Cr or a Cr alloy having a body-centered cubic (bcc) crystal structure and including nitrogen. The first underlayer 14 may be formed by sputtering within an inert gas atmosphere including nitrogen gas, made of a Cr alloy or Cr with the bcc crystal structure. A thickness of the first underlayer 14 is set in a range of 0.5 nm to 10 nm, and is preferably set in a range of 0.5 nm to 6.0 nm from the point of view of the S/N ratio. When forming the second underlayer 15 which includes nitrogen on the first underlayer 14, the first underlayer 14 does not need to include nitrogen and may be formed using Cr or a Cr alloy within an atmosphere not added with nitrogen gas.

The Cr alloy with the bcc crystal structure which forms the first underlayer 14 may be an alloy of Cr added with at least one element selected from a group of Mo, W, V and Ti. Adding one or more of these elements to Cr has the effect of expanding the crystal lattice of Cr, and improve the lattice matching of the first underlayer 14 with the first magnetic layer 16 and the second magnetic layer 19.

An amount of Mo, W or V added to the Cr to form the Cr alloy to be used for the first underlayer 14 is selected in a range greater than 0 atomic % (hereinafter simply at. %) and less than 100 at. %, and to appropriately suit the lattice constants of the first magnetic layer 16 and the second magnetic layer 19 which will be described later. For example, in a case where the first magnetic layer 16 is made of a CoCr alloy and the second magnetic layer 19 is made of a CoCrPtB alloy, it is preferable from the point of view of the lattice matching in the in-plane direction that the Mo-content of the CrMo first underlayer 14 is in a range of 20 at. % to 35 at. %, the W-content of the CrW first underlayer 14 is in a range of 15 at. % to 30 at. %, and the V-content of the CrV first underlayer 14 is in a range of 15 at. % to 30 at. %. Particularly in a case where the first magnetic layer 16 is made of a CoCr alloy and the second magnetic layer 19 is made of a CoCrPtB alloy having a Pt-content of approximately 11 at. %, the lattice matching in the in-plane direction improves in the above described composition ranges of the CrMo, CrW and CrV for the first underlayer 14.

An amount of Ti added to Cr to form the CrTi alloy to be used for the first underlayer 14 is preferably selected in a range greater than 0 at. % and 30 at. % or less. The CrTi alloy has a microcrystalline or non-crystal (or amorphous) structure if the Ti-content exceeds 30 at. %, and deteriorates the crystal orientation of the first magnetic layer 16 and the second magnetic layer 19.

The Cr alloy usable as the first underlayer 14 is not limited to the above, and may be CrTa or CrMn alloys having a bcc crystal structure with a preferred orientation of (200). In this case, in a case where the first magnetic layer 16 and the second magnetic layer 19 are made of a Co-based alloy having Co as a main component, it is possible to obtain a preferred (110) orientation resulting in the c-axis of the magnetic layer becoming in-plane.

Furthermore, B may be added to Cr or the Cr alloy used for the first underlayer 14. In this case, it is possible to reduce the crystal grain size of the first underlayer 14, and accordingly reduce the crystal grin sizes of the first magnetic layer 16 and the second magnetic layer 19. The amount of B added to the Cr or Cr alloy forming the first underlayer 14 is preferably greater than 0 at. % and 10 at. % or less, because the crystal orientations of the first magnetic layer 16 and the second magnetic layer 19 deteriorate if the B-content exceeds 10 at. %.

By adding the nitrogen gas into the inert gas atmosphere when forming the first underlayer 14, the coercivity squareness ratio increases, and the resolution, the overwrite performance and the S/N ratio improve, as will be described later in conjunction with the embodiments. The amount of nitrogen gas added to the inert gas may be in a range of 0.01 volume % (hereinafter simply vol. %) to 0.50 vol. %, and preferably in a range of 0.05 vol. % to 0.50 vol. % since the coercivity squareness ratio greatly increases and the resolution, the overwrite performance and the S/N ratio greatly improve in this latter preferable range. The decrease in the coercivity becomes notable with respect to the amount of nitrogen gas added when the amount of nitrogen gas added exceeds 0.50 vol. %. The inert gas may be selected from a group consisting of He, Ne, Ar, Kr and Xe, and more than one kind of inert gas may be selected if necessary.

The first underlayer 14 may have a multi-layer structure that is made up of a plurality of stacked layers. In this case, it is preferable that the total thickness of the multi-layer structure is approximately the same as the thickness of the first underlayer 14 having the single-layer structure that is made up of a single layer. When the first underlayer 14 has the multi-layer structure, it is possible to suppress the crystal grain size of the grains forming the first underlayer 14 from becoming large, to thereby suppress the enlargement of the crystal grain sizes of the first magnetic layer 16 and the second magnetic layer 19.

The second underlayer 15 may be made of Cr or a Cr alloy having a bcc crystal structure or, Cr or a Cr alloy having the bcc crystal structure and including nitrogen. It is preferable that the nitrogen concentration in the second underlayer 15 is lower than that in the first underlayer 14. The second underlayer 15 may be formed by sputtering within an inert gas atmosphere including nitrogen gas, made of a Cr alloy or Cr with the bcc crystal structure. A thickness of the second underlayer 15 is set in a range of 0.5 nm to 5 nm. The Cr alloy having the bcc crystal structure used for the second underlayer 15 may be similar to that used for the first underlayer 14.

If the second underlayer 15 and the first underlayer 14 are both made of the Cr alloy which is added with at least one element selected from the group consisting of Mo, W, V and Ti, the amount of the element added to Cr in the Cr alloy is preferably larger for the second underlayer 15 than the first underlayer 14. By gradually expanding the lattice size in the in-plane direction from the first underlayer 14 to the second underlayer 15 by the addition of the element to the Cr in the Cr alloy, it is possible to improve the lattice matching of the second underlayer 15 with respect to the first magnetic layer 16 and the second magnetic layer 19 without inducing excessive lattice distortion. As a result, it is possible to improve the S/N ratio. For similar reasons, if the first underlayer 14 is made of Cr, the second underlayer 15 is preferably made of a Cr alloy.

The second underlayer 15 may be formed by sputtering under an inert gas atmosphere or an inert gas atmosphere added with nitrogen gas. The inert gas may be selected from the group of inert gases described above. When adding the nitrogen gas to the inert gas, the amount of nitrogen gas added to the inert gas is selected in a range greater than 0 and 0.10 vol. % or less, so that the coercivity squareness ratio and the S/N ratio are improved. If the amount of nitrogen gas added to the inert gas exceeds 0.1 vol. %, an average output of the magnetic recording medium 10 dramatically decreases compared to the case where no nitrogen is added to the inert gas. It may be regarded that this dramatic decrease in the average output is caused by the deteriorated in-plane orientation of the first magnetic layer 16 that is formed on the second underlayer 15 and the deteriorated in-plane orientation that is passed on to the second magnetic layer 19.

Accordingly, it is particularly preferable to form the second underlayer 15 in an inert gas atmosphere not added with nitrogen gas, that is, in an inert-gas-only atmosphere. By using the inert-gas-only atmosphere, it is possible to improve the coercivity squareness ratio and the S/N ratio and maintain the average output of the magnetic recording medium 10 compared to the case where the nitrogen gas is added to the inert gas atmosphere. It may be regarded that the coercivity squareness ratio and the S/N ratio are improved and the average output of the magnetic recording medium 10 is maintained, because the surface of the second underlayer 15 is more active and the first magnetic layer 16 grows with good crystallinity when no nitrogen gas is added to the inert gas atmosphere, to thereby improve the crystal orientation of the first magnetic layer 16.

When forming the first underlayer 14 or the second underlayer 15 by sputtering, it is possible to form the layer within an inert gas atmosphere using a sputtering target that is made of a material including nitrogen, instead of forming the layer within an inert gas atmosphere including nitrogen gas.

The second underlayer 15 may have a multi-layer structure that is made up of a plurality of stacked layers. In this case, it is preferable that the total thickness of the multi-layer structure is approximately the same as the thickness of the second underlayer 15 having the single-layer structure that is made up of a single layer. When the second underlayer 15 has the multi-layer structure, it is possible to suppress the crystal grain size of the grains forming the second underlayer 15 from becoming large, to thereby suppress the enlargement of the crystal grain sizes of the first magnetic layer 16 and the second magnetic layer 19.

Moreover, the second underlayer 15 may be made of the same material as the first underlayer 14. The S/N ratio and the like improve when the second underlayer 15 is provided, but it is not essential to provide the second underlayer 15.

The first magnetic layer 16 may be made of Co, Ni, Fe, Co alloy, Ni alloy, Fe alloy and the like. It is particularly preferable to use CoCr, CoCrTa, CoCrPt or alloys thereof for the first magnetic layer 16. The preferable or CoCrTa or CoCrPt alloy may be obtained by adding an element selected from a group consisting of B, Mo, Nb, Ta, W, Cu and alloys thereof. The first magnetic layer 16 has a thickness in a range of 1 nm to 10 nm, and preferably in a range of 1 nm to 5 nm. The first magnetic layer 16 is epitaxially grown with the (110) texture on the second underlayer 15, and the c-axis is orientated in the in-plane direction, which means that the axis of easy magnetization matches the in-plane direction. The first magnetic layer 16 may have a multi-layer structure made up of a plurality of stacked layers, so that the c-axis orientation of the first magnetic layer 16 itself and the c-axis orientation of the second magnetic layer 19 are improved.

The nonmagnetic coupling layer 18 may be made of Ru, Rh, Ir, Ru alloy, Rh alloy, Ir alloy and the like, for example. For example, the nonmagnetic coupling layer 18 has a thickness in a range of 0.4 nm to 1.5 nm, and preferably in a range of 0.6 nm to 0.8 nm. By setting the thickness of the nonmagnetic coupling layer 18 to such a range, the magnetizations of the first magnetic layer 16 and the second magnetic layer 19 become antiferromagnetically exchange-coupled. Rh and Ir have an fcc structure, while Ru has the hcp structure. The lattice constant a=0.25 nm for the CoCrPt alloy used for the first magnetic layer 16, while the lattice constant a=0.27 nm for the Ru used for the nonmagnetic coupling layer 18. Hence, it is preferable to use Ru or a Ru alloy for the nonmagnetic coupling layer 18 so as to have the lattice parameter a close to that of the first magnetic layer 16. The Ru alloy used for the nonmagnetic coupling layer 18 may preferably be an alloy of Ru and an element selected from a group consisting of Ti, V, Cr, Mn, Fe, Co, Ni, Nb, Mo, Rh, Pd, Ta, W, Re, Os, Ir, Pt and alloys thereof.

The second magnetic layer 19 may be made of Co, Ni, Fe, Co alloy, Ni alloy, Fe alloy and the like, similarly as in the case of the first magnetic layer 16. It is particularly preferable to use CoCrTa, CoCrPt or alloys thereof for the second magnetic layer 19. The preferable CoCrTa or CoCrPt alloy may be obtained by adding an element selected from a group consisting of B, Mo, Nb, Ta, W, Cu and alloys thereof. The second magnetic layer 19 has a thickness in a range of 5 nm to 30 nm. Since the stacked structure from the first seed layer 12 up to the second magnetic layer 19 is formed by epitaxial growth of the layers, the stacked structure has good crystallinity, and has reduced medium noise since the crystal grain size is controlled.

The first magnetic layer 16 and the second magnetic layer 19 may be made of similar compositions. In addition, when using CoCrPt alloys for the first magnetic layer 16 and the second magnetic layer 19, the second magnetic layer 19 may have a greater Pt-content than that of the first magnetic layer 16. Because the recording magnetic field applied to the second magnetic layer 19 is larger than that applied simultaneously to the first magnetic layer 16 which is farther away from a magnetic head than the second magnetic layer 19, the increase of the Pt-content of the second magnetic layer 19 will not increase the anisotropic magnetic field larger than the first magnetic layer 16 nor considerably deteriorate the overwrite performance, so that a high thermal stability can be achieved. Of course, the second magnetic layer 19 may have a multi-layer structure made up of a plurality of stacked layers.

It is preferable that a product of a remanent magnetization Mr1 and a thickness t1 of the first magnetic layer 16 (that is, a remanent magnetization and thickness product Mr1×t1) and a product of a remanent magnetization Mr2 and a thickness t2 of the second magnetic layer 19 (that is, a remanent magnetization and thickness product Mr2×t2) satisfy a relationship (Mr2×t2)>(Mr1×t1). The NLTS improves because the information written on the second magnetic layer 19, which is closer to the magnetic head than the first magnetic layer 16, is written in correspondence with switching positions of the recording magnetic field at the time of the recording, with a higher accuracy than on the first magnetic layer.

The protection layer 20 may be made of Diamond-Like Carbon (DLC), carbon nitride, amorphous carbon and the like and formed by sputtering. The protection layer 20 has a thickness in a range of 0.5 nm to 10 nm, and preferably in a range of 0.5 nm to 5 nm.

The lubricant layer 21 may be made of an organic liquid lubricant having perfluoropolyether as a main chain and —OH, phenyl, benzene ring or the like as the terminal functional group. The organic liquid lubricant may be diluted by a fluoric solvent or the like, and the lubricant layer 21 may be formed by pulling, spin-coating, liquid submersion and the like. More particularly, ZDol manufactured by Monte Fluos (terminal functional group: —OH), AM3001 manufactured by Ausimonoto (terminal functional group: benzene ring), Z25 manufactured by Monte Fluos, and the like, with a thickness in a range of 0.5 nm to 3.0 nm, may be used for the lubricant layer 21. The lubricant may be appropriately selected depending on the material used for the protection layer 20. In a case where the magnetic recording medium 10 has a tape-shape, the lubricant layer 21 may be formed by a die coating process and the like.

A nonmagnetic intermediate layer (not shown), made of a nonmagnetic alloy having a hcp structure and having a thickness in a range of 1 nm to 5 nm, may be formed between the second underlayer 15 and the first magnetic layer 16, as indicated by an arrow in FIG. 1. The nonmagnetic alloy forming the nonmagnetic intermediate layer may be obtained by adding an element or alloy M to a CoCr alloy, where M is selected from a group consisting of Pt, B, Mo, Nb, Ta, W, Cu and alloys thereof. The nonmagnetic intermediate layer grows epitaxially by inheriting the crystallinity and crystal grain size of the second underlayer 15, to thereby improve the crystallinity, reduce the crystal grain (magnetic grain) size distribution width and promote the x-axis orientation in the in-plane direction (that is, direction parallel to the substrate surface) of the first magnetic layer 16 and the second magnetic layer 19.

According to this embodiment, the magnetic recording medium 10 has the first magnetic layer 16 and the second magnetic layer 19 which are antiferromagnetically exchange-coupled via the nonmagnetic coupling layer 18, and the first underlayer 14 which is sputtered in the inert gas atmosphere including nitrogen gas made of the Cr or Cr alloy having the bcc crystal structure. As a result, it is possible to greatly improve the coercivity squareness ratio, the resolution and the S/N ratio of the magnetic recording medium 10.

Next, a description will be given of various embodiments of the present invention in comparison with various comparison examples.

EMBODIMENTS I-V AND COMPARISON EXAMPLES C1-C5

Magnetic disks in accordance with embodiments I-V and comparison examples C1-C5 were made with the following stacked structure made up of a textured glass substrate that has been subjected to texturing, a 25 nm thick $Cr_{50}Ti_{50}$ first seed layer, a 10 nm thick $Al_{50}Ru_{50}$ second seed layer, a 3 nm thick first underlayer, a 3 nm thick second underlayer, a 2 nm thick $Co_{90}Cr_{10}$ first magnetic layer, a 0.8 nm thick Ru nonmagnetic coupling layer, a 16 nm thick $Co_{60}Cr_{18}Pt_{11}B_{8}Cu_{3}$ second magnetic layer, a 5.5 nm thick DLC protection layer, and a 1.5 nm thick AM3001 lubricant layer.

Each of the layers of the stacked structure, excluding the AM3001 lubricant layer, was formed by a DC magnetron sputtering apparatus. The inside of the DC magnetron sputtering apparatus was exhausted to $4\times10^{-5}$ Pa or less, and the textured glass substrate was heated to a temperature of 180° C., before forming the $Cr_{50}Ti_{50}$ first seed layer on the textured glass substrate. The pressure within the DC magnetron sputtering apparatus was set to 0.67 Pa except when forming the DLC protection layer. The layers were formed in an Ar gas atmosphere except when forming the first underlayer. The numerical values in the above described composition of each of the layers of the stacked structure indicate the amount in at. %, and similar designations will be used in the following description.

FIG. 2 is a diagram showing the structures and the characteristics of first and second underlayers of the magnetic disks in accordance with the embodiments I-V of the present invention and the magnetic disks in accordance with comparison examples C1-C5. FIG. 2 shows the composition and the amount of $N_2$ added to the Ar gas atmosphere when forming the first underlayer, the composition of the second underlayer, the coercivity, the coercivity squareness ratio and the resolution for each of the magnetic disks. In addition, a composition followed by N in brackets, namely, "(N)", indicates that the composition is formed within the Ar gas atmosphere added with nitrogen gas.

In the magnetic disks in accordance with the embodiments I-V, the first underlayer 14 was formed in the Ar gas atmosphere added with 0.1 vol. % of nitrogen gas, made of Cr or a CrMo alloy. On the other hand, in the magnetic disks in accordance with the comparison examples C1-C5, the first underlayer was formed in the Ar gas atmosphere not added with nitrogen gas, made of the same metal materials as in the embodiments I-V. The second underlayer 15 of the embodiments I-V and the second underlayer of the comparison examples C1-C5 were made of a CrMo alloy or a CrW alloy.

By comparing the embodiments I-V and the comparison examples C1-C5, it may be seen that the coercivity squareness ratio and the resolution of the embodiments I-V which form the first underlayer 14 under the Ar gas atmosphere added with 0.1 vol. % of nitrogen gas are improved from those of the comparison examples C1-C5 which form the first underlayer in the Ar gas atmosphere not added with nitrogen gas. Hence, it may be seen that the coercivity squareness ratio and the resolution are improved by adding the nitrogen gas to the Ar gas atmosphere when forming the first underlayer 14.

More particularly, when the embodiment I having the Cr(N) first underlayer 14 and the $Cr_{85}Mo_{25}$ second underlayer 15 is compared to the comparison example C1 having the Cr first underlayer and $Cr_{75}Mo_{25}$ second underlayer, the coercivity squareness ratio of the embodiment I increases by 0.05 compared to that of the comparison example C1, and the resolution of the embodiment I improves by 1% compared to that of the comparison example C1.

The embodiment IV uses $Cr_{92.5}W_{7.5}$ for the second underlayer 15 in place of $Cr_{75}Mo_{25}$ used in the embodiment I. When the embodiment IV having the Cr(N) first underlayer 14 and the $Cr_{92.5}Mo_{7.5}$ second underlayer 15 is compared to the comparison example C4 having the Cr first underlayer and $Cr_{92.5}Mo_{7.5}$ second underlayer, the coercivity squareness ratio of the embodiment IV increases by 0.09 compared to that of the comparison example C4, and the resolution of the embodiment IV improves by 2.1% compared to that of the comparison example C4.

The embodiment V uses $Cr_{95}W_5$ for the first underlayer 14 in place of Cr(N) used in the embodiment I. When the embodiment V having the $Cr_{95}W_5$ first underlayer 14 and the $Cr_{75}Mo_{25}$ second underlayer 15 is compared to the comparison example C5 having the $Cr_{95}W_5$ first underlayer and $Cr_{75}Mo_{25}$ second underlayer, the coercivity squareness ratio of the embodiment V increases by 0.05 compared to that of the comparison example C5, and the resolution of the embodiment V improves by 1% compared to that of the comparison example C5.

Therefore, it may be seen that the coercivity squareness ratio and the resolution can be improved by forming the Cr or CrMo first underlayer 14 under the Ar gas atmosphere added with the nitrogen gas.

Measurements were made using a Vibration Sample Magnetometer (VSM) with a maximum applied magnetic field of 795.7 kA/m, and static magnetic characteristics such as the coercivity and the coercivity squareness ratio shown in FIG. 2 were obtained from the hysteresis loop of each magnetic disk.

Figure 3:
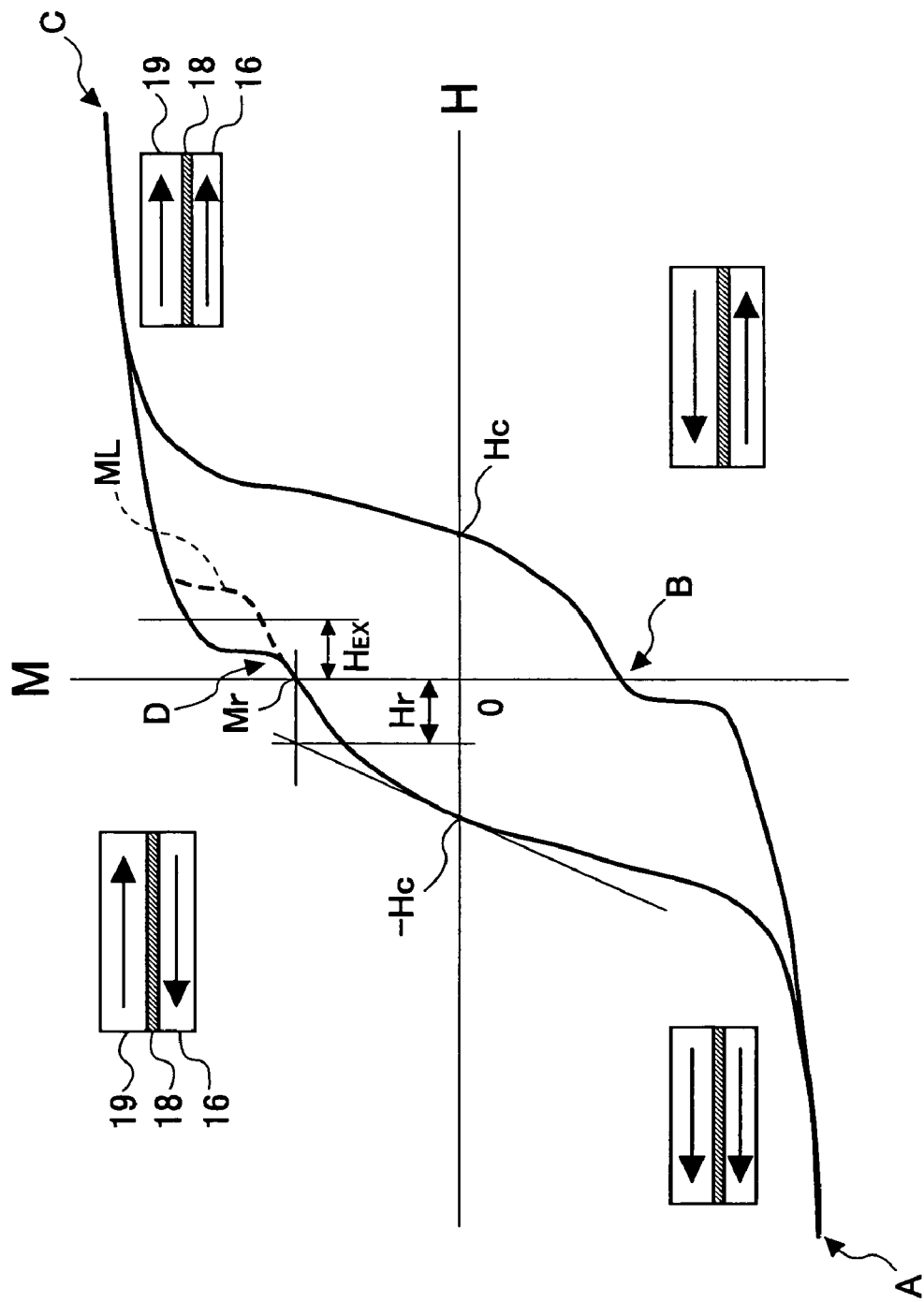
FIG. 3 is a diagram showing a magnetization hysteresis loop of the magnetic disk.

FIG. 3 is a diagram showing a magnetization hysteresis loop of the magnetic disk. In FIG. 3, the ordinate indicates the magnetization M in arbitrary units, and the abscissa indicates the external magnetic field H in arbitrary units. A coercivity squareness ratio S* was obtained from a formula S*=Hr/Hc, based on the coercivity Hc and Hr, where Hr denotes a magnetic field at an intersection of a tangent to the hysteresis loop at −Hc (or Hc) and a straight line extending parallel to the H-axis from a remanent magnetization Mr.

In FIG. 3, magnetization directions of the first and second magnetic layers 16 and 19 are indicated by arrows for each of the points A, B, C and D by arrows, to indicate the parallel magnetization states and the antiparallel magnetization states. An exchange coupling field Hex and a minor loop ML shown in FIG. 3 will be described later in conjunction with FIG. 6.

A composite type magnetic head made up of an inductive type recording element and a GMR reproducing element was used for the measurements of the resolution and electromagnetic transducer characteristics such as the average output, the overwrite performance, the S/Nm ratio and the Siso/Nm ratio. The measurements were made by setting a peripheral velocity of the magnetic disk to 12.6 m/sec. An average output Siso at a linear recording density of 89 kFCI was obtained as the average output. The resolution (%) was obtained from (Resolution)=(Average Output at 89 kFCI)/(Average Output at 714 kFCI)×100. The overwrite performance (dB) was obtained by measuring an output V1 at 89 kFCI, writing a signal at 714 kFCI, measuring a residual output V2 at 89 kFCI, and obtaining (Overwrite Performance)=10×log(V2/V1). The S/Nm ratio (dB) was obtained from 10×log(S/Nm), based on the average output S at 357 kFCI and the medium noise Nm. The Siso/Nm ratio (dB) was obtained from 10×log (Siso/Nm), based on the average output Siso at 89 kFCI and the medium noise Nm.

EMBODIMENT VI AND COMPARISON EXAMPLE C6

Next, a description will be given of characteristics of a magnetic disk in accordance with an embodiment VI, by referring to FIGS. 4 through 10. In the embodiment VI, the amount of nitrogen gas added into the Ar gas atmosphere when forming the first underlayer 14 is varied from 0 to 0.50 vol. % in 0.05 vol. % increments. In addition, the $Cr_{75}Mo_{25}$ second underlayer 15 is formed within an Ar gas atmosphere not added with nitrogen gas.

In FIG. 2, a comparison example C6 corresponds to the case where the amount of nitrogen gas added into the Ar gas atmosphere when forming the first underlayer is 0, that is, when no nitrogen gas is added. In each of the characteristics shown in FIGS. 4 through 10, characteristic values are interpolated based on the characteristic values obtained at the 0.05 vol. % increments.

Magnetic disks in accordance with embodiment VI and the comparison example C6 were made with the following stacked structure made up of a textured glass substrate that has been subjected to texturing, a 25 nm thick $Cr_{50}Ti_{50}$ first seed layer, a 10 nm thick $Al_{50}Ru_{50}$ second seed layer, a 3 nm thick Cr(N) first underlayer, a 3 nm thick $Cr_{75}Mo_{25}$ second underlayer, a 2 nm thick $Co_{90}Cr_{10}$ first magnetic layer, a 0.8 nm thick Ru nonmagnetic coupling layer, a 16 nm thick $Co_{60}Cr_{18}Pt_{11}B_8Cu_3$ second magnetic layer, a 5.5 nm thick DLC protection layer, and a 1.5 nm thick AM3001 lubricant layer. Conditions under which the layers of the stacked structure are formed, except for the first underlayer, are the same as those of the embodiment I described above.

Figure 4:
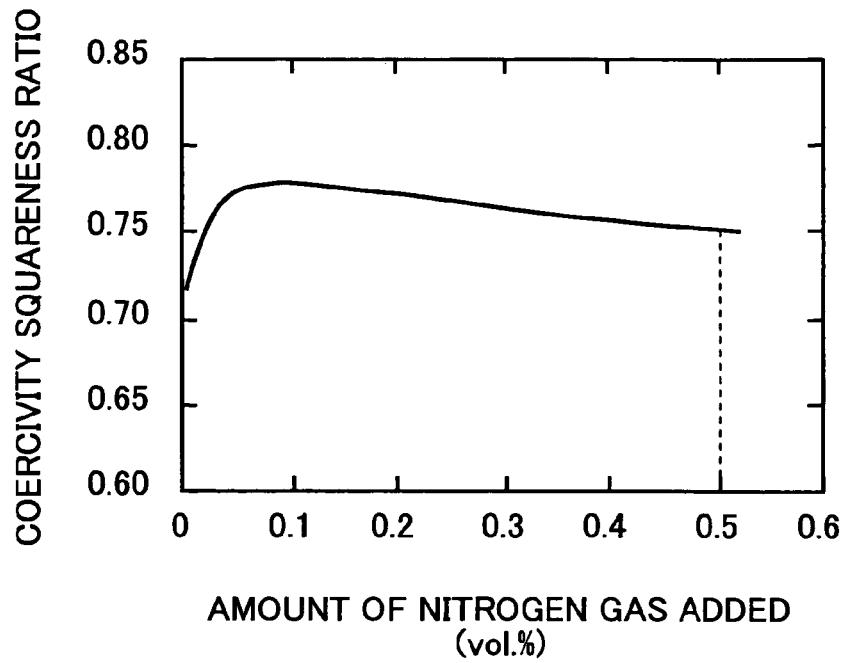
FIG. 4 is a diagram showing a relationship of a coercivity squareness ratio and an amount of added nitrogen gas in an embodiment VI of the present invention.

FIG. 4 is a diagram showing a relationship of the coercivity squareness ratio and the amount of added nitrogen gas in the embodiment VI. In FIG. 4, the ordinate indicates the coercivity squareness ratio, and the abscissa indicates the amount (vol. %) of added nitrogen gas. In the magnetic disk in accordance with the embodiment VI, the Cr(N) first underlayer 14 is formed within the Ar gas atmosphere including the nitrogen gas. When the amount of nitrogen gas added to the Ar gas atmosphere is 0.05 vol. % and small, the coercivity squareness ratio dramatically increases and the coercivity squareness ratio reaches a maximum value when the amount of added nitrogen gas is approximately 0.10 vol. %, as shown in FIG. 4. The maximum coercivity squareness ratio increased by 0.06 compared to 0.72 which is maximum coercivity squareness ratio obtained when no nitrogen gas is added. In addition, even when the amount of added nitrogen gas reaches 0.5 vol %, the coercivity squareness ratio is higher than the case where no nitrogen gas is added, and the coercivity squareness ratio is maintained stable. Accordingly, it was confirmed that the addition of a small amount of nitrogen gas to the Ar gas atmosphere when forming the first underlayer 14 greatly increases the coercivity squareness ratio.

Figure 5:
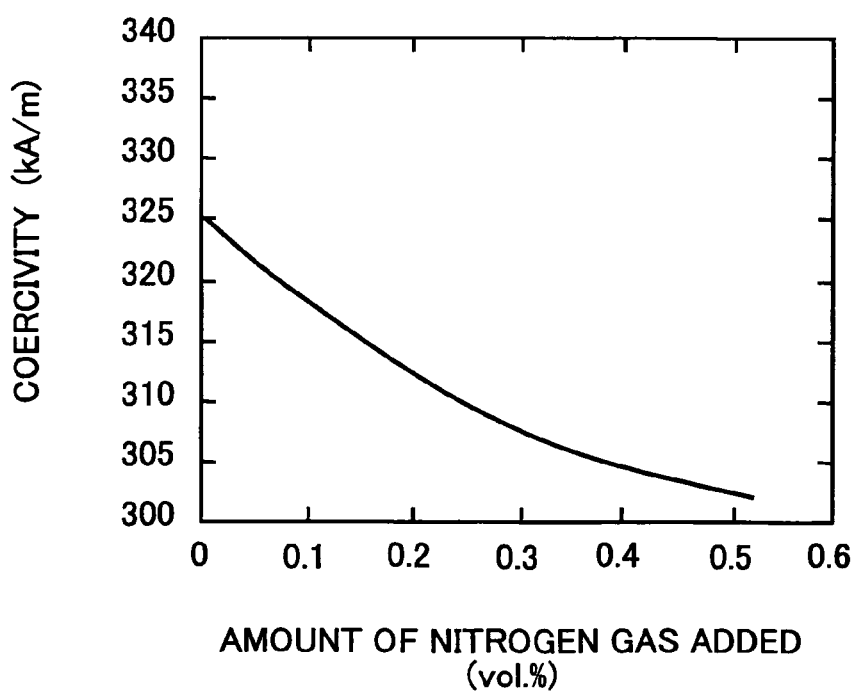
FIG. 5 is a diagram showing a relationship of a coercivity and the amount of added nitrogen gas in the embodiment VI of the present invention.

FIG. 5 is a diagram showing a relationship of the coercivity and the amount of added nitrogen gas in the embodiment VI. In FIG. 5, the ordinate indicates the coercivity (kA/m), and the abscissa indicates the amount (vol. %) of added nitrogen gas. The coercivity of the magnetic disk in accordance with the embodiment VI decreases as the amount of added nitrogen gas increases. Compared to the case where no nitrogen gas is added, the decrease in the coercivity is approximately 22 kA/m (278 Oe) when the amount of added nitrogen gas is 0.50 vol. %, but it has been confirmed that such a small decrease in the coercivity will not affect the thermal stability. In addition, by setting the substrate heating temperature to a relatively high temperature, it is possible to suppress or prevent the decrease in the coercivity. According to the experiments conducted by the present inventors, it was confirmed that the amount of decrease in the coercivity becomes large if the amount of added nitrogen gas exceeds 0.50 vol. %, and that the coercivity dramatically decreases if the amount of added nitrogen gas exceeds 0.75 vol. %. Therefore, from the point of view of the margin of producing magnetic disks (or magnetic recording media), preferable amount of nitrogen gas is less than 0.50 vol. %.

Figure 6:
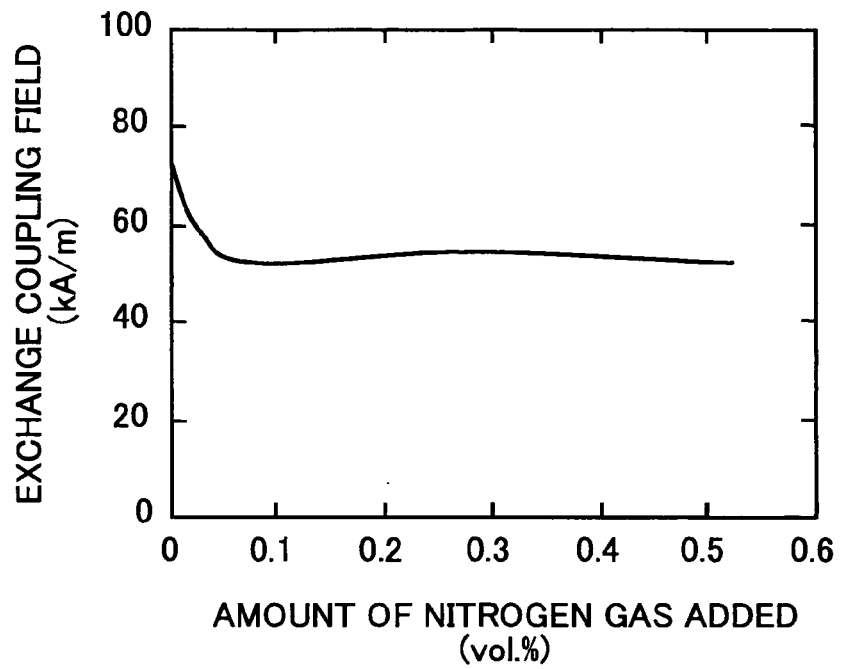
FIG. 6 is a diagram showing a relationship of an exchange coupling field and the amount of added nitrogen gas in the embodiment VI of the present invention.

FIG. 6 is a diagram showing a relationship of the exchange coupling field and the amount of added nitrogen gas in the embodiment VI. In FIG. 6, the ordinate indicates the exchange coupling field (kA/m), and the abscissa indicates the amount (vol. %) of added nitrogen gas. In FIG. 3 described above, HEX denotes the exchange coupling field, that is, the magnetic field at a center of a loop which is formed by a minor loop ML and a major loop, where the minor loop ML is indicated by a broken line and the major loop is indicated by a solid line on a positive magnetic field side of a point D. The exchange coupling field $H_{EX}$ was measured by once setting the applied magnetic field H to a vicinity of the point D from the point C, for example, and then increasing the applied magnetic field H in the same direction, so as to obtain the minor loop ML. An exchange coupling field is also obtained in a similar manner on a negative magnetic field side of the point B, and in this case, the exchange coupling field can be measured by once setting the applied magnetic field H to a vicinity of the point B from the point A, for example, and then increasing the applied magnetic field H in the same direction, so as to obtain a minor loop. The exchange coupling field from the first magnetic layer 16 acts on the second magnetic layer 19, and the exchange coupling field from the second magnetic layer 19 acts on the first magnetic layer 16. The thermal stability improves when the exchange coupling field is large, but it becomes more difficult to switch the magnetization directions of the first and second magnetic layers 16 and 19 by the recording magnetic field, to thereby deteriorate the overwrite performance and the S/Nm ratio.

It may be seen from FIG. 6 that the exchange coupling field of the magnetic disk in accordance with the embodiment VI dramatically decreases by the addition of a small amount of nitrogen gas into the Ar gas atmosphere. Further, the exchange coupling field becomes approximately constant when the amount of added nitrogen gas is 0.05 vol. % or greater. Accordingly, it may be seen that the exchange coupling field is controllable by the amount of added nitrogen gas. Hence, the amount of added nitrogen gas may be set by using the S/Nm ratio, which will be described later, as an index.

Figure 7:
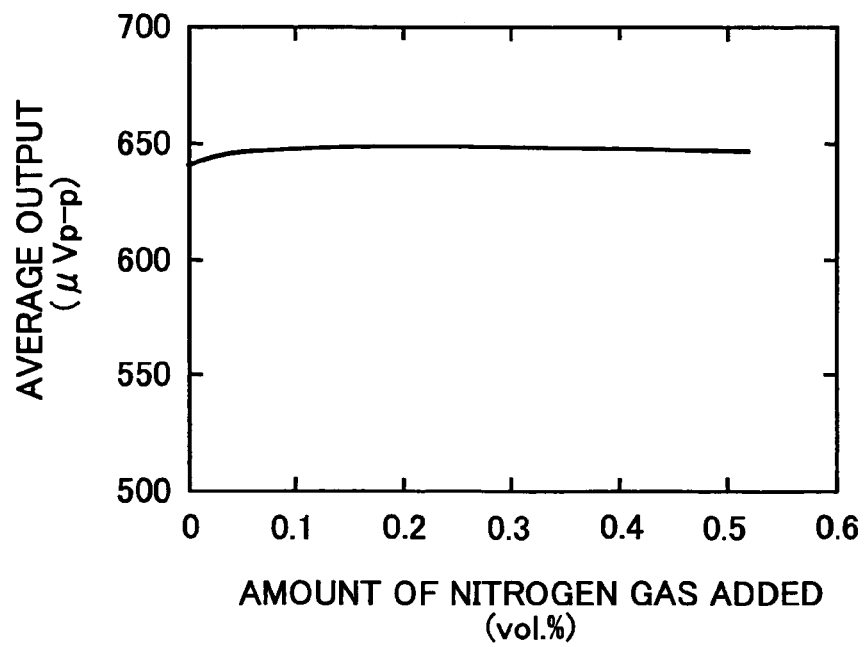
FIG. 7 is a diagram showing a relationship of an average output and the amount of added nitrogen gas in the embodiment VI of the present invention.

FIG. 7 is a diagram showing a relationship of the average output and the amount of added nitrogen gas in the embodiment VI. In FIG. 7, the ordinate indicates the average output (μVp-p), and the abscissa indicates the amount (vol. %) of added nitrogen gas. As may be seen from FIG. 7, the average output of the magnetic disk in accordance with the embodiment VI is approximately constant when the amount of added nitrogen gas is in a range greater than 0 and 0.50 vol. % or less. Hence, it may be seen that the addition of nitrogen gas to the Ar gas atmosphere does not affect the output obtained from the magnetic head when the magnetic head reads the information from the magnetic disk, and thus, it may be regarded that the in-plane orientation of the first underlayer 14 does not change by the addition of the nitrogen gas when forming the first underlayer 14.

Figure 8:
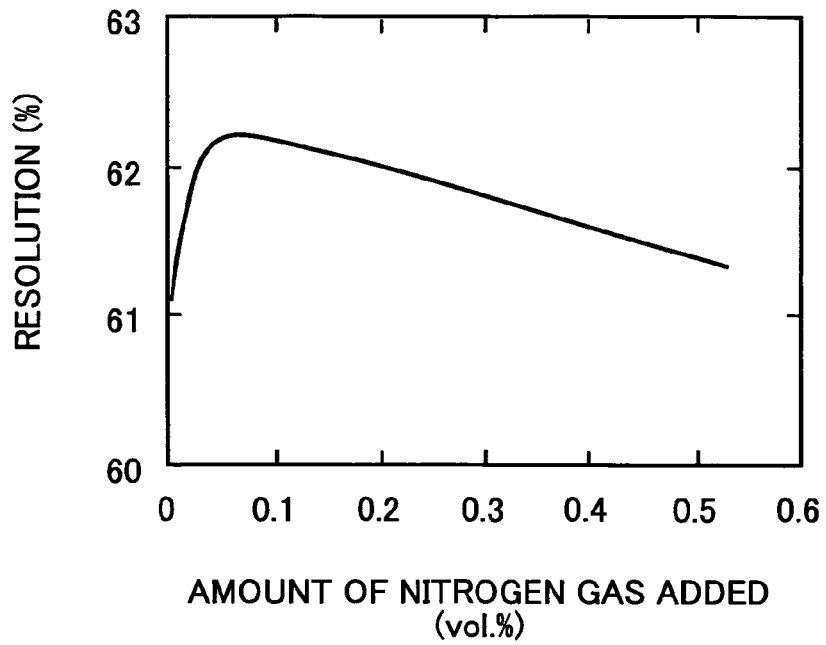
FIG. 8 is a diagram showing a relationship between a resolution and the amount of added nitrogen gas in the embodiment VI of the present invention.

FIG. 8 is a diagram showing a relationship between the resolution and the amount of added nitrogen gas in the embodiment VI. In FIG. 8, the ordinate indicates the resolution (%), and the abscissa indicates the amount (vol. %) of added nitrogen gas. It may be seen from FIG. 8 that the resolution of the magnetic disk in accordance with the embodiment VI increases by the addition of nitrogen gas into the Ar gas atmosphere when the amount of added nitrogen gas is small on the order of 0.05 vol. % or less. It may also be seen from FIG. 8 that when the amount of added nitrogen gas is 0.50 vol. % or less, the resolution is higher than that compared to the case where no nitrogen gas is added. It may easily be surmised that the coercivity squareness ratio contributes to the improvement of the resolution, since the resolution increases even though the coercivity decreases as shown in FIG. 5 when the amount of added nitrogen gas increases.

Figure 9:
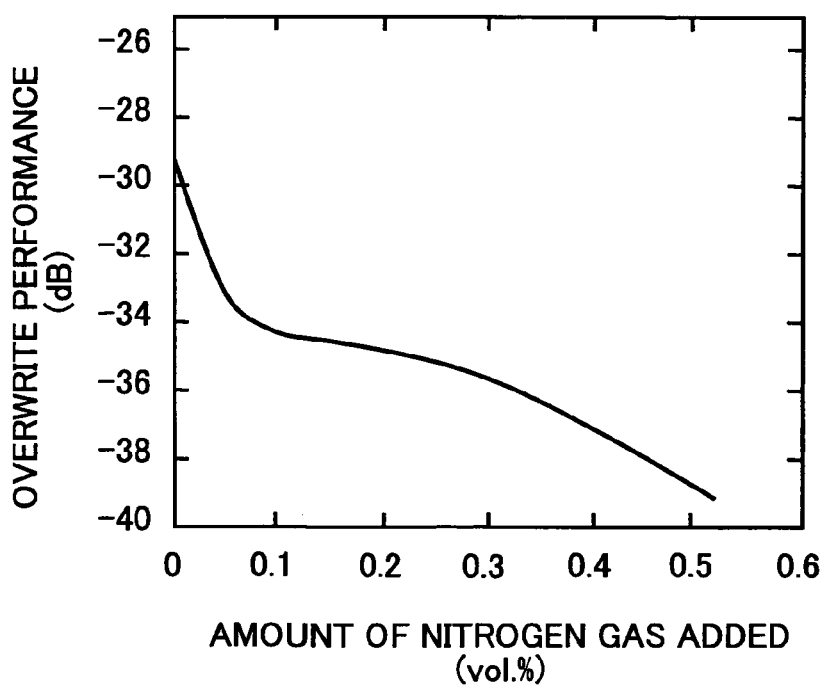
FIG. 9 is a diagram showing a relationship of an overwrite performance and the amount of added nitrogen gas in the embodiment VI of the present invention.

FIG. 9 is a diagram showing a relationship of the overwrite performance and the amount of added nitrogen gas in the embodiment VI. In FIG. 9, the ordinate indicates the overwrite performance (dB), and the abscissa indicates the amount (vol. %) of added nitrogen gas. It may be seen from FIG. 9 that the overwrite performance of the magnetic disk in accordance with the embodiment VI greatly improves by the addition of a small amount of nitrogen gas on the order of approximately 0.05 vol. % or less. Since the coercivity decreases as shown in FIG. 5 when the amount of added nitrogen gas is in this range, it may be surmised that the improved overwrite performance is caused by the decrease in the exchange coupling field shown in FIG. 6 rather than the decrease in the coercivity. Hence, it may be surmised that the small amount of added nitrogen gas addition on the order of approximately 0.05 vol. % or less decreases the exchange coupling field, to thereby improve the overwrite characteristic.

It may also be seen from FIG. 9 that when the amount of added nitrogen gas is greater than 0.05 vol. %, the overwrite performance is further improved. It may be regarded that the further improvement in the overwrite performance is caused by the decrease in the coercivity in addition to the effects of the decrease in the exchange coupling field.

Figure 10:
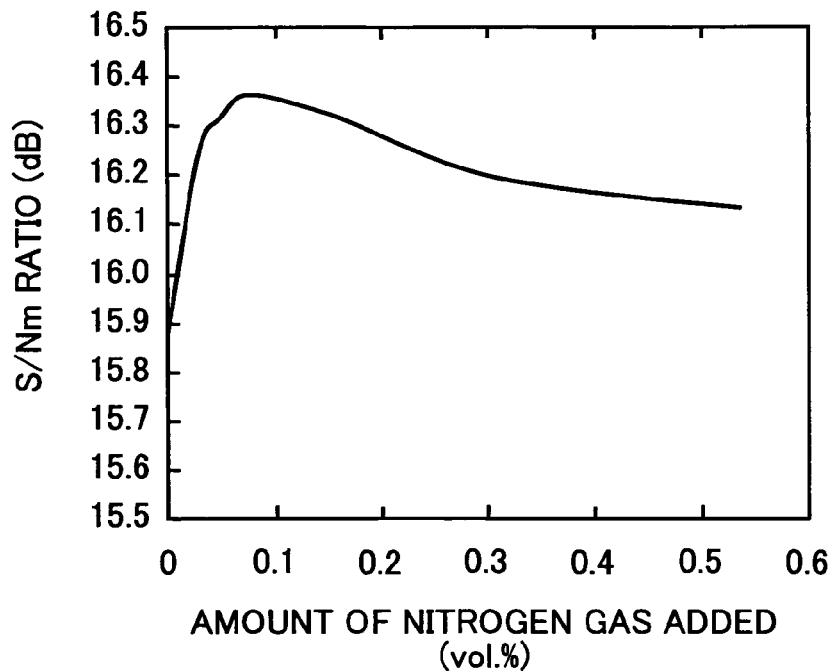
FIG. 10 is a diagram showing a relationship of a S/Nm ratio and the amount of added nitrogen gas in the embodiment VI of the present invention.

FIG. 10 is a diagram showing a relationship of the S/Nm ratio and the amount of added nitrogen gas in the embodiment VI. In FIG. 10, the ordinate indicates the S/Nm ratio (dB), and the abscissa indicates the amount (vol. %) of added nitrogen gas. As may be seen from FIG. 10, the S/Nm ratio of the magnetic disk in accordance with the embodiment VI greatly improves by the addition of a small amount of nitrogen gas on the order of approximately 0.05 vol. % or less. In addition, even when the amount of added nitrogen gas is 0.50 vol. %, the S/Nm ratio is 0.2 dB higher than the case where no nitrogen gas is added. Hence, it may be seen that the S/Nm ratio can be improved when the amount of added nitrogen gas is greater than 0 and 0.50 vol. % or less. Moreover, compared to the case where no nitrogen gas is added, it may be seen from FIG. 10 that the addition of even a small amount of nitrogen gas on the order of approximately 0.05 vol. % or less, such as 0.01 vol. %, for example, greatly improves the S/Nm ratio.

From FIGS. 4 through 9, it may be surmised that the resolution and the overwrite performance improve due to the increase in the coercivity squareness ratio and the decrease in the exchange coupling field when the nitrogen gas is added to the Ar gas atmosphere when forming the first underlayer 14, and the S/Nm ratio improves as a result.

EMBODIMENT VII

Next, a description will be given of characteristics of a magnetic disk in accordance with an embodiment VII, by referring to FIGS. 11 and 12. In the embodiment VII, the thickness of the Cr(N) first underlayer 14 is varied from 1.0 nm to 6.0 nm in 1.0 nm increments. The layers other than the Cr(N) first underlayer 14 are the same as those of the embodiment VI described above. A comparison example C7 corresponds to the case where the thickness of the Cr(N) first underlayer is 0, that is, when no Cr(N) first underlayer is provided.

Figure 11:
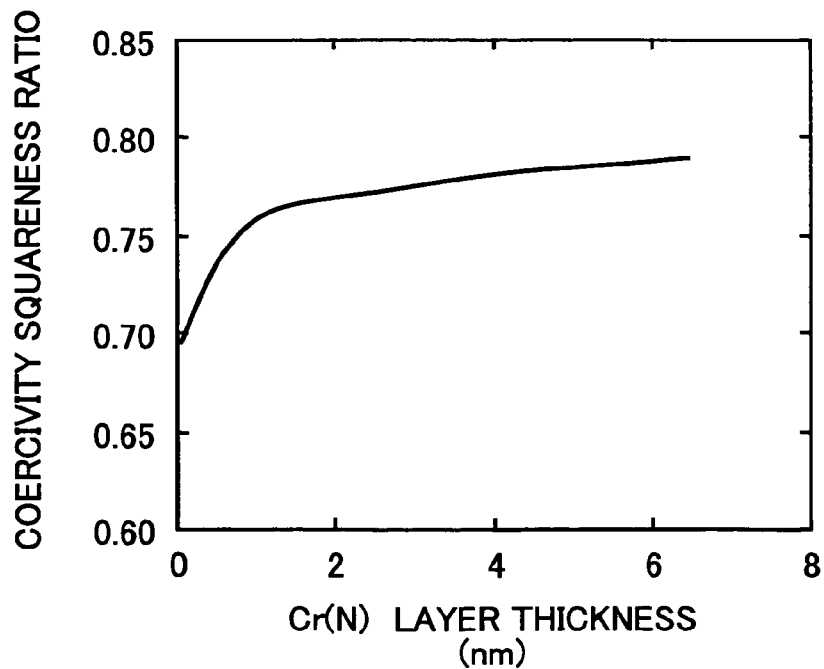
FIG. 11 is a diagram showing a relationship of a coercivity squareness ratio and a Cr(N) layer thickness in an embodiment VII of the present invention.

FIG. 11 is a diagram showing a relationship of the coercivity squareness ratio and the Cr(N) layer thickness in the embodiment VII. In FIG. 11, the ordinate indicates the coercivity squareness ratio, and the abscissa indicates the Cr(N) layer thickness (nm). As may be seen from FIG. 11, the coercivity squareness ratio of the magnetic disk in accordance with the embodiment VII is improved, even when the thickness of the Cr(N) first underlayer 14 is on the order of approximately 0.5 nm and small, compared to the case where no Cr(N) first underlayer is provided. In addition, the coercivity squareness ratio shown in FIG. 11 gradually increases when the thickness of the Cr(N) first underlayer 14 is 1 nm or greater. Accordingly, it may be seen from FIG. 11 that the thickness of the Cr(N) first underlayer 14 needs to be approximately 0.5 nm or greater.

Figure 12:
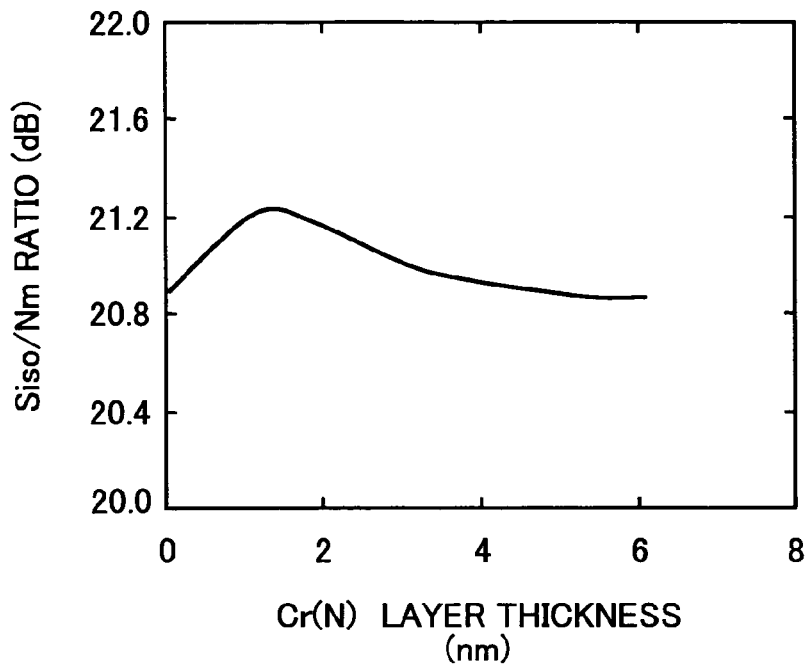
FIG. 12 is a diagram showing a relationship of an Siso/Nm ratio and the Cr(N) layer thickness in the embodiment VII of the present invention.

FIG. 12 is a diagram showing a relationship of the Siso/Nm ratio and the Cr(N) layer thickness in the embodiment VII. In FIG. 12, the ordinate indicates the Siso/Nm ratio (dB), and the abscissa indicates the Cr(N) layer thickness (nm). As may be seen from FIG. 12, the Siso/Nm ratio of the magnetic disk in accordance with the embodiment VII has a maximum value when the thickness of the Cr(N) first underlayer 14 is approximately 1.5 nm, and the Siso/Nm ratio in a range of 0.5 nm to 6.0 nm is improved compared to the case where no Cr(N) first underlayer is provided. Accordingly, from the results of FIGS. 11 and 12, it may be seen that the thickness of the Cr(N) first underlayer 14 is preferably set in a range of 0.5 nm or greater and 6.0 nm or less.

EMBODIMENTS VIII AND IX

Next, a description will be given of characteristics of a magnetic disk in accordance with embodiments VIII and IX, by referring to FIGS. 13 through 16. In the embodiment VIII, the amount of nitrogen gas added into the Ar gas atmosphere when forming the first underlayer 14 and the amount of nitrogen gas added into the Ar gas atmosphere when forming the second underlayer 15 are set to the same amount, and this amount of added nitrogen gas is varied from 0 to 0.50 vol. % in 0.05 vol. % increments. In the embodiment VIII, a 3 nm thick Cr(N) first underlayer 14 and a 3 nm thick $Cr_{75} Mo_{25}$ (N) second underlayer 15 are used, and the other layers are the same as those of the embodiment I described above. In the embodiment IX, no nitrogen gas is added to the Ar gas atmosphere when forming the first underlayer 14 and the amount of nitrogen gas added to the Ar gas atmosphere when forming the second underlayer 15 is varied from 0 to 0.50 vol. %. In the embodiment IX, a 3 nm thick Cr first underlayer 14 and a 3 nm thick $Cr_{75} Mo_{25}$(N) second underlayer 15 are used, and the other layers are the same as those of the embodiment I described above.

Figure 13:
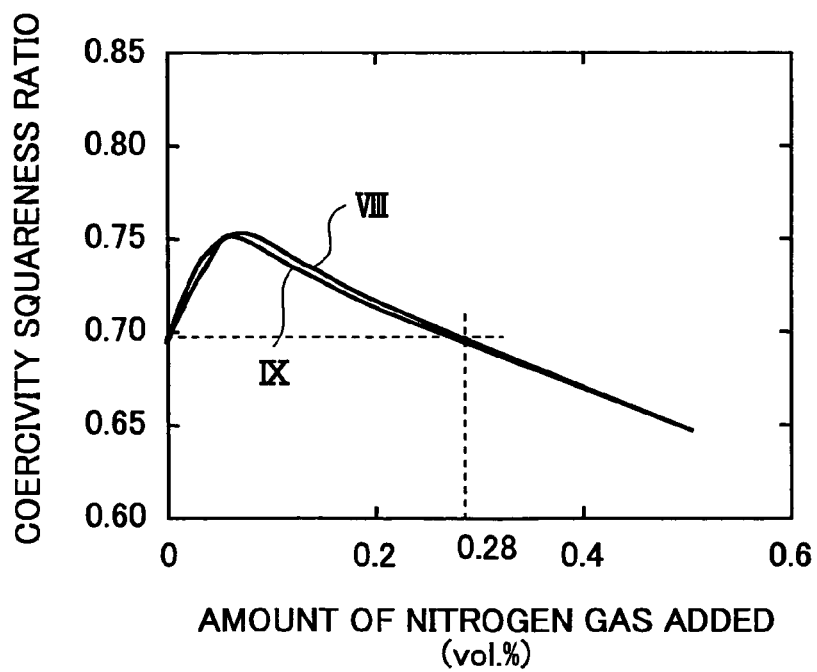
FIG. 13 is a diagram showing relationships of a coercivity squareness ratio and an amount of added nitrogen gas in embodiments VIII and IX of the present invention.

FIG. 13 is a diagram showing relationships of the coercivity squareness ratio and the amount of added nitrogen gas in the embodiments VIII and IX. In FIG. 13, the ordinate indicates the coercivity squareness ratio, and the abscissa indicates the amount (vol. %) of added nitrogen gas. As may be seen from FIG. 13, the magnetic disks in accordance with the embodiments VIII and IX have approximately the same coercivity squareness ratio. In a range where the amount of added nitrogen gas is greater than 0 and 0.28 vol. % or less, the squareness ratio of the embodiments VIII and IX is larger than that for the case where no nitrogen gas is added. But when the nitrogen gas is added to the Ar gas atmosphere when forming the second underlayer 15, the coercivity squareness ratio is smaller than that of the embodiment VI shown in FIG. 4 where the nitrogen gas is added to the Ar gas atmosphere only when forming the first underlayer 14. Furthermore, the range in which the nitrogen gas may be added to the Ar gas atmosphere to improve the coercivity squareness ratio in the embodiments VIII and IX is narrower than that of the embodiment VI shown in FIG. 4 where the nitrogen gas is added to the Ar gas atmosphere only when forming the first underlayer 14.

Figure 14:
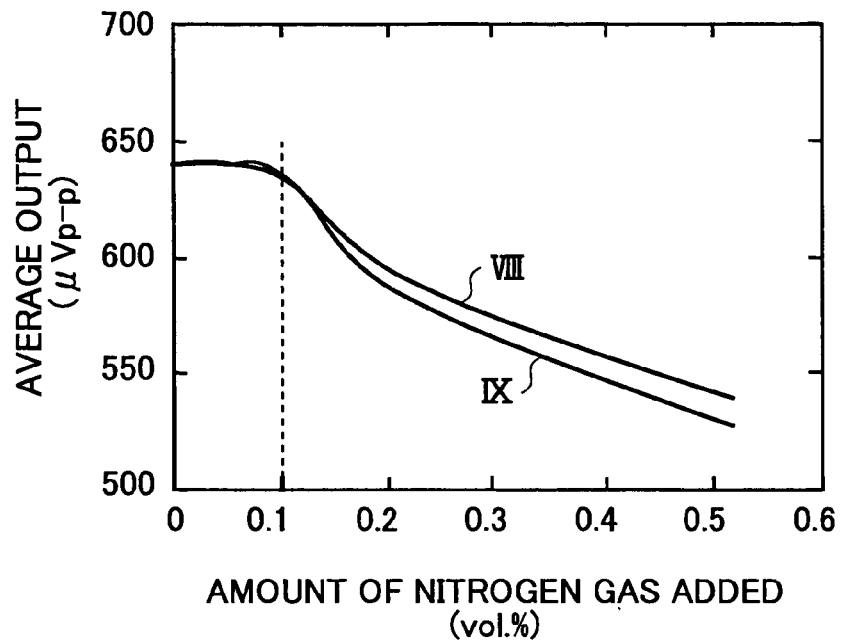
FIG. 14 is a diagram showing relationships of an average output and the amount of added nitrogen gas in the embodiments VIII and IX of the present invention.

FIG. 14 is a diagram showing relationships of the average output and the amount of added nitrogen gas in the embodiments VIII and IX. In FIG. 14, the ordinate indicates the average output (μVp-p), and the abscissa indicates the amount (vol. %) of added nitrogen gas. As may be seen from FIG. 14, when the amount of nitrogen gas added to the Ar gas atmosphere is in a range greater than 0 and 0.10 vol. % or less, the average outputs of the magnetic disks in accordance with the embodiments VIII and IX are approximately the same as that for the case where no nitrogen gas is added. When the amount of added nitrogen gas exceeds 0.10 vol. %, the average output dramatically decreases. Thus, it may be seen that the in-plane orientations of the first and second magnetic layers 16 and 19 deteriorate when excessive nitrogen is added to the $Cr_{75}Mo_{25}(N)$ second underlayer 15. Therefore, it may be seen that the amount of nitrogen gas added to the Ar gas atmosphere when forming the second underlayer 15 is preferably in a range greater than 0 and 0.10 vol. % or less.

Figure 15:
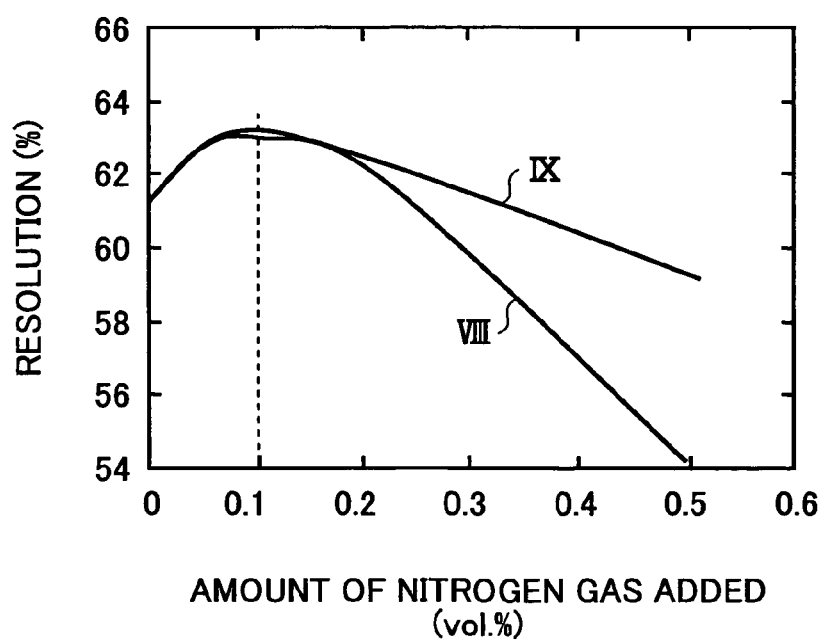
FIG. 15 is a diagram showing relationships of a resolution and the amount of added nitrogen gas in the embodiments VIII and IX of the present invention.

FIG. 15 is a diagram showing relationships of the resolution and the amount of added nitrogen gas in the embodiments VIII and IX. In FIG. 15, the ordinate indicates the resolution (%), and the abscissa indicates the amount (vol. %) of added nitrogen gas. As may be seen from FIG. 15, when the amount of nitrogen gas added to the Ar gas atmosphere is in a range greater than 0 and 0.2 vol. % or less, the resolutions of the magnetic disks in accordance with the embodiments VIII and IX are improved compared to that for the case where no nitrogen gas is added.

Figure 16:
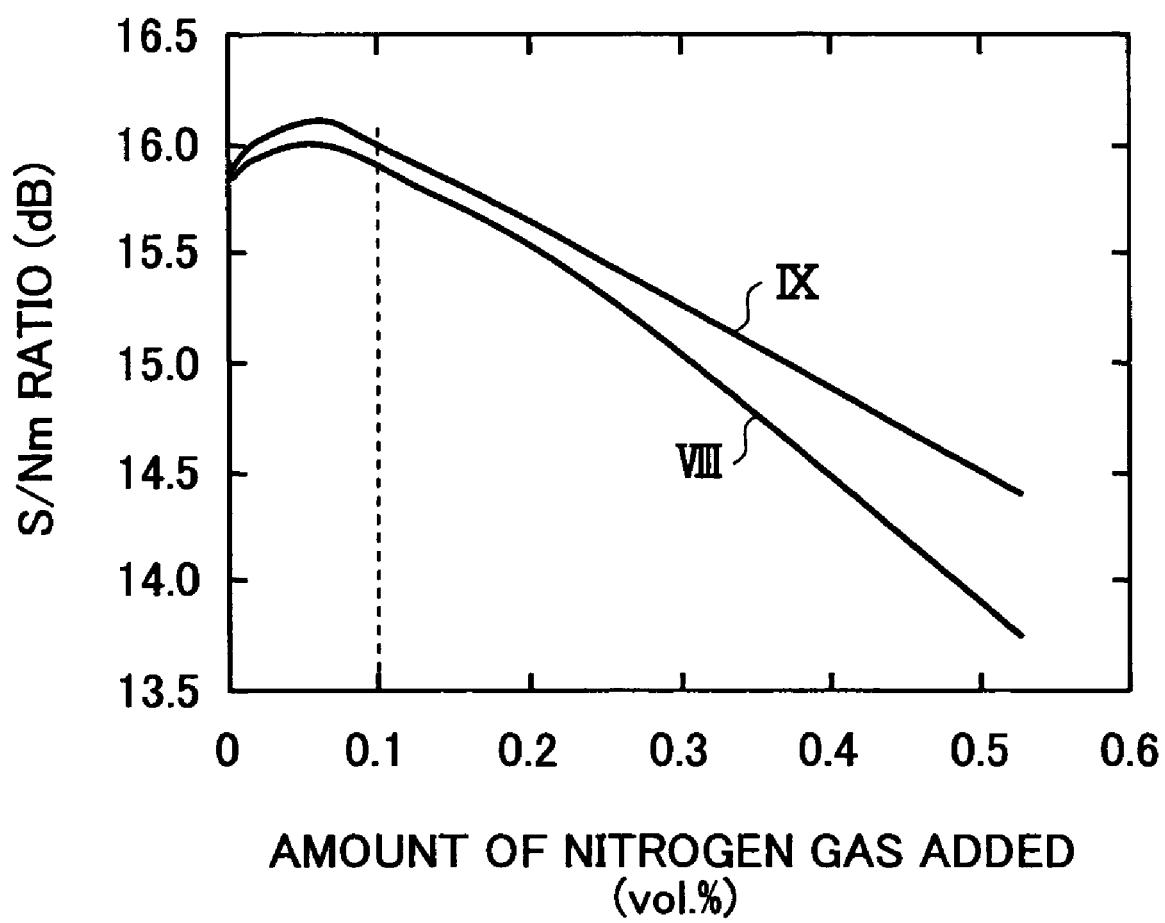
FIG. 16 is a diagram showing relationships of a S/Nm ratio and the amount of added nitrogen gas in the embodiments VIII and IX of the present invention.

FIG. 16 is a diagram showing relationships of the S/Nm ratio and the amount of added nitrogen gas in the embodiments VIII and IX. In FIG. 16, the ordinate indicates the S/Nm ratio (dB), and the abscissa indicates the amount (vol. %) of added nitrogen gas. As may be seen from FIG. 16, when the amount of nitrogen gas added to the Ar gas atmosphere is in a range greater than 0 and 0.1 vol. % or less, the S/Nm ratios of the magnetic disks in accordance with the embodiments VIII and IX are improved compared to that for the case where no nitrogen gas is added.

Accordingly, from the results of FIGS. 13 through 16, it may be seen that the amount of nitrogen gas added to the Ar gas atmosphere when forming the second underlayer 15 is preferably set in a range greater than 0 and 0.1 vol. % or less.

Figure 17:
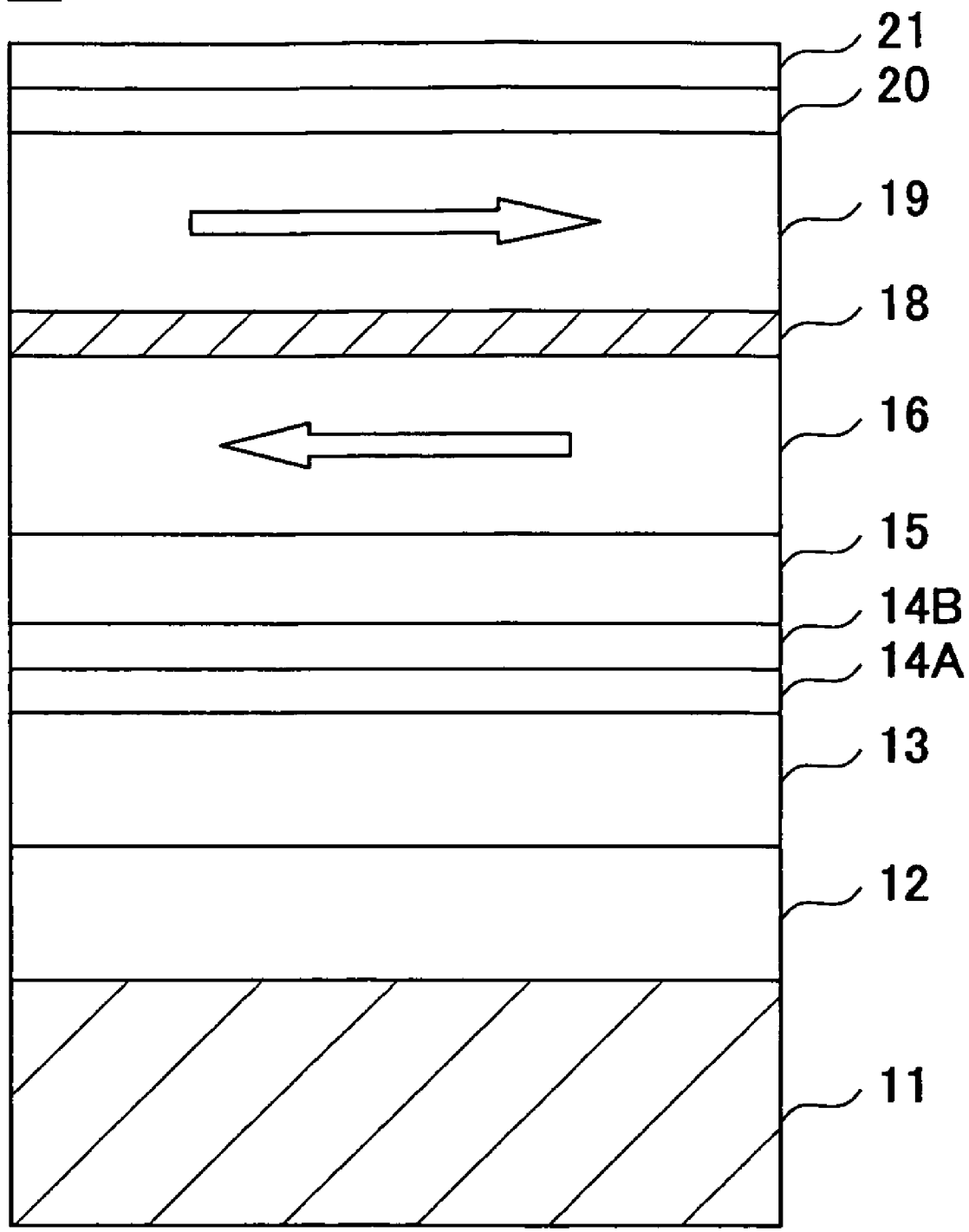
FIG. 17 is a cross sectional view showing a second embodiment of a magnetic recording medium according to the present invention.
Figure 18:
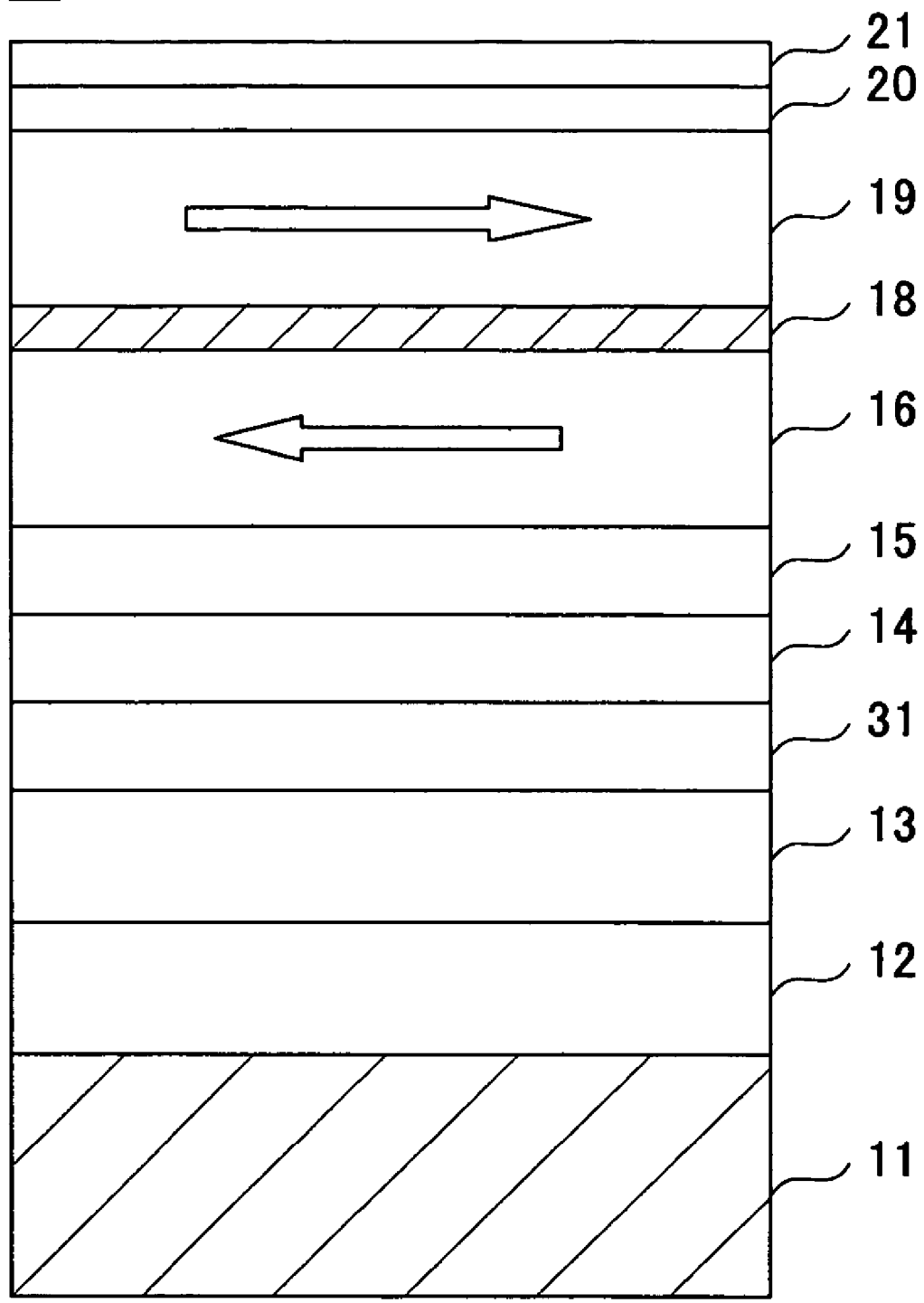
FIG. 18 is a cross sectional view showing a third embodiment of the magnetic recording medium according to the present invention.
Figure 19:
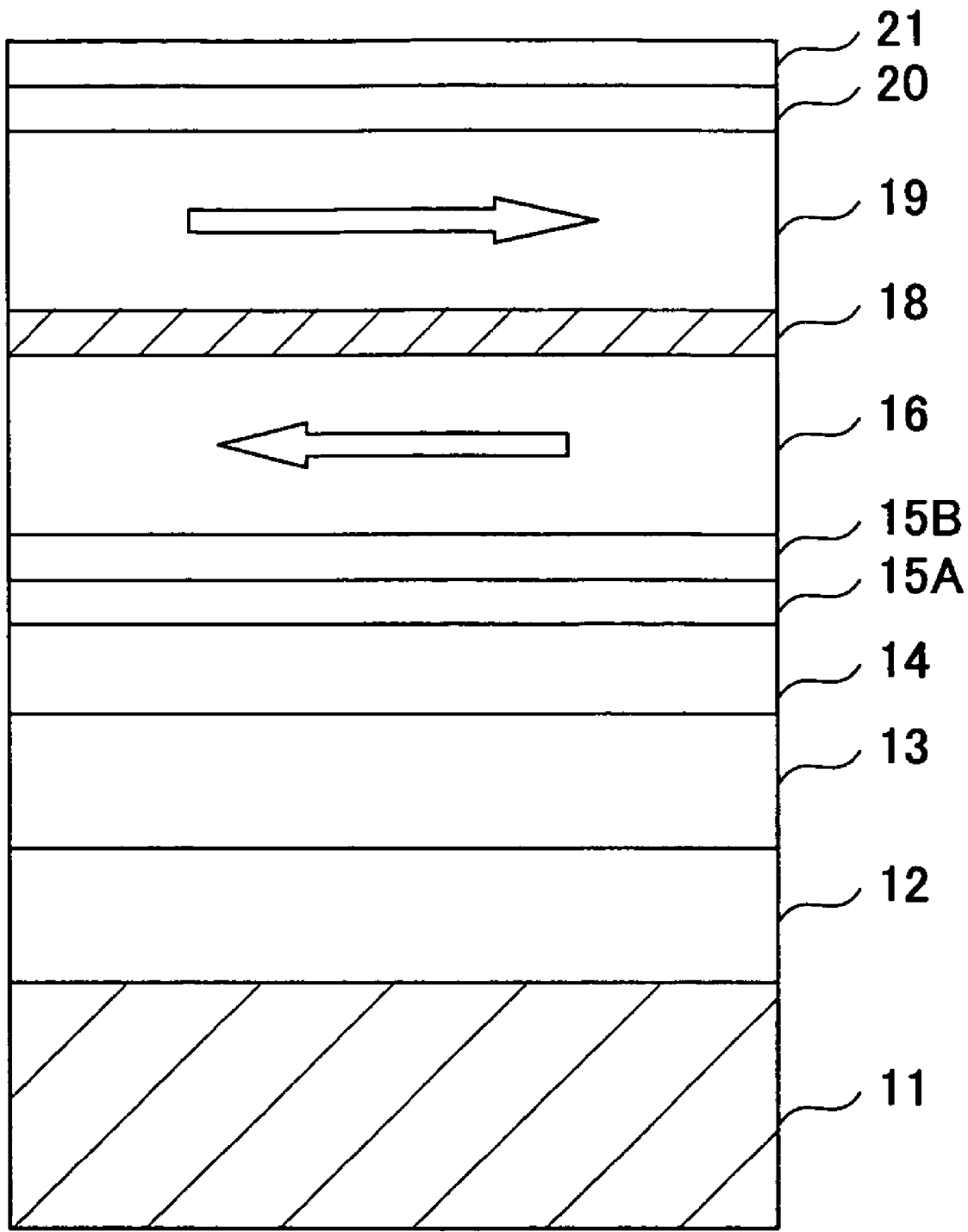
FIG. 19 is a cross sectional view showing a fourth embodiment of the magnetic recording medium according to the present invention.

Next, a description will be given of embodiments of the magnetic recording medium according to the present invention, by referring to FIGS. 1 and 17 through 19. In FIGS. 17 through 19, those parts which are the same as those corresponding parts in FIG. 1 are designated by the same reference numerals, and a detailed description thereof will be omitted.

FIG. 1 is a cross sectional view showing the first embodiment of the magnetic recording medium according to the present invention. The magnetic recording medium 10 shown in FIG. 1 has the first seed layer 12, the second seed layer 13, the first underlayer 14, the second underlayer 15, the first magnetic layer 16, the nonmagnetic coupling layer 18, the second magnetic layer 19, the protection layer 20 and the lubricant layer 21 that are stacked on the substrate 11.

The first underlayer 14 is made of Cr or a Cr alloy having the bcc crystal structure. The first underlayer 14 may be formed by forming a layer of a material made of Cr or a Cr alloy having the bcc crystal structure within an inert gas atmosphere added with nitrogen gas in a range of 0.01 vol. % to 0.50 vol. %, for example, and preferably in a range of 0.05 vol. % to 0.50 vol. %.

The second underlayer 15 is made of Cr or a Cr alloy having the bcc crystal structure or, Cr or a Cr alloy including nitrogen. The second underlayer 15 may be formed by forming a layer of a material made of Cr or a Cr alloy having the bcc crystal structure within an inert gas atmosphere added with nitrogen gas in a range of 0.00 vol. % to 0.10 vol. %, for example. The second underlayer 15 may include substantially no nitrogen. In this specification, a layer made of a material which includes substantially no nitrogen refers to a layer which is formed within a gas environment not added with nitrogen by use of a material including no nitrogen.

FIG. 17 is a cross sectional view showing a second embodiment of the magnetic recording medium according to the present invention. A magnetic recording medium 30 shown in FIG. 17 has a first seed layer 12, a second seed layer 13, a first-A underlayer 14A, a first-B underlayer 14B, a second underlayer 15, a first magnetic layer 16, a nonmagnetic coupling layer 18, a second magnetic layer, a protection layer 20 and a lubricant layer 21 that are stacked on a substrate 11.

The first-A underlayer 14A and the first-B underlayer 14B respectively are made of a material similar to that of the first underlayer 14 of the magnetic recording medium 10 shown in FIG. 1. A total thickness of the first-A underlayer 14A and the first-B underlayer 14B is preferably set approximately equal to the thickness of the first underlayer 14 of the magnetic recording medium 10 having the single-layer structure. By making each of the first-A underlayer 14A and the first-B underlayer 14B thin, it is possible to suppress the crystal grain sizes of the grains forming the first-A underlayer 14A and the first-B underlayer 14B from becoming large, to thereby suppress enlargement of the crystal grain sizes of the first magnetic layer 16 and the second magnetic layer 19.

For example, the combination of the first-A underlayer 14A and the first-B underlayer 14B may be made of a Cr alloy including nitrogen, similarly to the first underlayer 14 of the magnetic recording medium 10. In this case, the concentration of the added element in at. % within the Cr alloy forming the first-B underlayer 14B is higher than that of the first-A underlayer 14A. By setting the concentration of the added elements in this manner, it is possible to improve the lattice matching between the first-A underlayer 14A and the first-B underlayer 14B, and accordingly improve the lattice matching between the first-B underlayer 14B and the second underlayer 15. As a result, it is possible to improve the crystallinity of the second underlayer 15, to thereby improve the crystallinities of the first magnetic layer 16 and the second magnetic layer 19. Furthermore, in the magnetic recording medium 30, it is preferable that the second underlayer 15 includes substantially no nitrogen.

FIG. 18 is a cross sectional view showing a third embodiment of the magnetic recording medium according to the present invention. A magnetic recording medium 32 shown in FIG. 18 has a first seed layer 12, a second seed layer 13, a third underlayer 31, a first underlayer 14, a second underlayer 15, a first magnetic layer 16, a nonmagnetic coupling layer 18, a second magnetic layer, a protection layer 20 and a lubricant layer 21 that are stacked on a substrate 11.

The third underlayer 31 is made of a Cr or a Cr alloy having the bcc crystal structure. The Cr alloy having the bcc crystal structure may be similar to the Cr alloy used for the first underlayer 14. The third underlayer 31 may be formed by sputtering a layer of a material made of Cr or a Cr alloy having the bcc crystal structure within an inert gas atmosphere, for example. It is possible to improve the crystallinity of the initial layer growth of the first underlayer 14 by providing the third underlayer 31 which includes no nitrogen as a base or underlayer for the first underlayer 14. Moreover, in the magnetic recording medium 32, it is preferable that the second underlayer 15 includes substantially no nitrogen.

FIG. 19 is a cross sectional view showing a fourth embodiment of the magnetic recording medium according to the present invention. A magnetic recording medium 35 shown in FIG. 19 has a first seed layer 12, a second seed layer 13, a first underlayer 14, a second-A underlayer 15A, a second-B underlayer 15B, a first magnetic layer 16, a nonmagnetic coupling layer 18, a second magnetic layer, a protection layer 20 and a lubricant layer 21 that are stacked on a substrate 11.

The second-A underlayer 15A and the second-B underlayer 15B respectively are made of a material similar to that of the second underlayer 15 of the magnetic recording medium 10 shown in FIG. 1, that is, Cr or a Cr alloy having the bcc crystal structure or, Cr or a Cr alloy including nitrogen. A total thickness of the second-A underlayer 15A and the second-B underlayer 15B is preferably set approximately equal to the thickness of the second underlayer 15 of the magnetic recording medium 10 having the single-layer structure. By making each of the second-A underlayer 15A and the second-B underlayer 15B thin, it is possible to suppress the crystal grain sizes of the grains forming the second-A underlayer 15A and the second-B underlayer 15B from becoming large, to thereby suppress enlargement of the crystal grain sizes of the first magnetic layer 16 and the second magnetic layer 19.

For example, the combination of the second-A underlayer 15A and the second-B underlayer 15B may be made of a Cr alloy including substantially no nitrogen, similarly to the second underlayer 15 of the magnetic recording medium 10. In this case, the concentration of the added element in at. % within the Cr alloy forming the second-B underlayer 15B is higher than that of the second-A underlayer 15A. By setting the concentration of the added elements in this manner, it is possible to improve the lattice matching between the second-A underlayer 15A and the second-B underlayer 15B, and accordingly improve the lattice matching between the second-B underlayer 15B and the first magnetic layer 16. As a result, it is possible to improve the crystallinities of the first magnetic layer 16 and the second magnetic layer 19.

Figure 20:
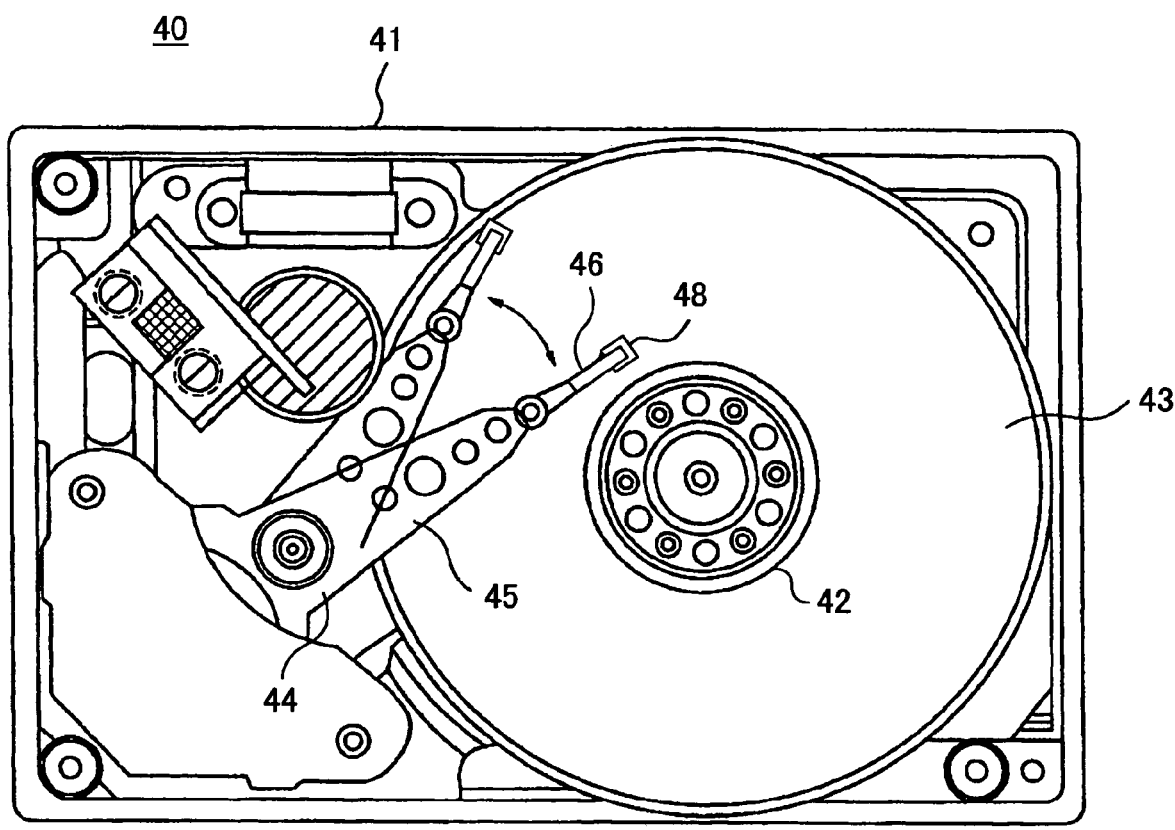
FIG. 20 is a plan view showing an important part of an embodiment of a magnetic storage apparatus according to the present invention.

Next, a description will be given of an embodiment of a magnetic storage apparatus according to the present invention, by referring to FIG. 20. FIG. 20 is a plan view showing an important part of this embodiment of the magnetic storage apparatus according to the present invention.

A magnetic storage apparatus 40 shown in FIG. 20 is generally made up of a housing 41. A hub 42 that is driven by a spindle motor (not shown), one or a plurality of magnetic recording media 43 fixed on the hub 42, an actuator unit 44, an arm 45 mounted on the actuator unit 44 and movable in a radial direction of the magnetic recording medium 43, a suspension 46 provided on the arm 45, and a magnetic head 48 supported on the suspension 46 are provided within the housing 41. The number of arms 45, suspensions 46 and magnetic heads 48 that are provided depends on the number of magnetic recording media 43 that are provided.

The magnetic head 48 may be formed by a composite head that is made up of a reproducing head and a recording head. For example, the reproducing head may be formed by a magneto-resistive (MR) element, a giant magneto-resistive (GMR) element or a tunneling magnetic-resistive (TMR). The recording head may be formed by an inductive head, for example. The basic structure itself of the magnetic storage apparatus 40 shown in FIG. 20 is known, and a detailed description thereof will be omitted in this specification.

In the magnetic storage apparatus 40, the magnetic recording medium 43 may have the structure of any one of the embodiments of the magnetic recording medium described above. In other words, the magnetic recording medium 10, 30, 32 or 35 may be used as the magnetic recording medium 43. Since the magnetic recording medium 43 has superior coercivity squareness ratio, resolution, overwrite performance, S/N ratio and thermal stability, it is possible to realize the magnetic storage apparatus 40 having superior thermal stability and S/N ratio.

Needless to say, the basic structure of the magnetic storage apparatus 40 is not limited to that shown in FIG. 20, and the magnetic head 48 is also not limited to that described above.

Two or more embodiments of the magnetic recording medium described above may be appropriately combined if necessary to suit the needs.

Of course, the present invention is not limited to magnetic disks, and the magnetic recording medium, the magnetic storage apparatus and the method of producing the magnetic recording medium according to the present invention can of course be applied to other magnetic recording media such as magnetic tapes.

Further, the present invention is not limited to these embodiments, but various variations and modifications may be made without departing from the scope of the present invention.

What is claimed is:

1. A magnetic recording medium comprising:
   a substrate;
   a first underlayer provided on the substrate;
   a first magnetic layer provided on the first underlayer;
   a nonmagnetic coupling layer provided on the first magnetic layer; and
   a second magnetic layer provided on the nonmagnetic coupling layer,
   wherein the first and second magnetic layers are exchange-coupled, and have magnetizations that are mutually anti-parallel in a state where no external field is applied to the magnetic recording medium, and
   the first underlayer is made of Cr or a Cr alloy each having a bcc crystal structure and including nitrogen, and further wherein the first underlayer has a thickness in a range of 0.5 nm to 6.0 nm.

2. The magnetic recording medium as claimed in claim 1, wherein the first underlayer is formed in a gas atmosphere including nitrogen gas in a range of 0.01 vol.% to 0.50 vol.%.

3. The magnetic recording medium as claimed in claim 1, further comprising:
   a second underlayer, provided between the first underlayer and the first magnetic layer, and made of Cr or a Cr alloy having a bcc crystal structure or, Cr or a Cr alloy each having a bcc crystal structure and including nitrogen.

4. The magnetic recording medium as claimed in claim 3, wherein the second underlayer is made of a material including substantially no nitrogen.

5. The magnetic recording medium as claimed in claim 3, wherein the second underlayer is made of the Cr or the Cr alloy having the bcc structure and is formed in a gas atmosphere including nitrogen gas in a range of 0.00 vol.% to 0.10 vol.%.

6. The magnetic recording medium as claimed in claim 5, wherein a nitrogen concentration within the gas atmosphere in which the second underlayer is formed is lower than a nitrogen concentration within a gas atmosphere in which the first underlayer is formed.

7. The magnetic recording medium as claimed in claim 3, wherein the Cr alloy which forms at least one of the first and second underlayers, includes at least one added element selected from a group consisting of Mo, W, V and Ti.

8. The magnetic recording medium as claimed in claim 7, wherein the second underlayer has a concentration of the added element in at.% higher than that of the first underlayer.

9. The magnetic recording medium as claimed in claim 7, wherein the first underlayer is made up of a first layer and a second layer that are successively stacked, the second layer closer to the first magnetic layer having a concentration of the added element in at.% higher than that of the first layer closer to the substrate.

10. The magnetic recording medium as claimed in claim 7, wherein the second underlayer is made up of a first layer and a second layer that are successively stacked, the second layer closer to the first magnetic layer having a concentration of the added element in at.% higher than that of the first layer closer to the substrate.

11. The magnetic recording medium as claimed in claim 3, further comprising:

a third underlayer, provided immediately under the first underlayer, and made of Cr or a Cr alloy.

12. The magnetic recording medium as claimed in claim 3, wherein the second underlayer has a thickness in a range of 0.5 nm to 5 nm.

13. The magnetic recording medium as claimed in claim 1, further comprising:
a seed layer, provided between the substrate and the underlayer, and made of a nonmagnetic amorphous metal or an alloy having a B2 structure.

14. The magnetic recording medium as claimed in claim 13, wherein the seed layer is made up of a first layer and a second layer that are successively stacked on the substrate, wherein the first layer is made of a nonmagnetic amorphous metal and the second layer is made of an alloy having a B2 structure.

15. The magnetic recording medium as claimed in claim 13, wherein the nonmagnetic amorphous metal is selected from a group consisting of NiP, CoW, AlTi and CrTi.

16. The magnetic recording medium as claimed in claim 13, wherein the alloy having the B2 structure is selected from a group consisting of AlRu, NiAl and FeAl.

17. The magnetic recording medium as claimed in claim 1, wherein the first magnetic layer is made of CoCr, CoCrPt, CoCr including an added material, or CoCrPt including the added material, wherein the added material is selected from a group consisting of B, Mo, Nb, Ta, W, Cu and alloys thereof.

18. The magnetic recording medium as claimed in claim 1, wherein the first magnetic layer is made of CoCrTa or, CoCrTa including an added material, wherein the added material is selected from a group consisting of B, Mo, Nb, W, Cu and alloys thereof.

19. The magnetic recording medium as claimed in claim 1, wherein the second magnetic layer is made of CoCrPt or, CoCrPt including an added material, wherein the added material is selected from a group consisting of B, Mo, Nb, Ta, W, Cu and alloys thereof.

20. A magnetic recording medium comprising:
a substrate;
a first underlayer provided on the substrate;
a second underlayer provided on the first underlayer;
a first magnetic layer provided on the second underlayer;
a nonmagnetic coupling layer provided on the first magnetic layer; and
a second magnetic layer provided on the nonmagnetic coupling layer,
wherein the first and second magnetic layers are exchange-coupled, and have magnetizations that are mutually antiparallel in a state where no external field is applied to the magnetic recording medium,
the first underlayer is made of Cr or a Cr alloy each having a bcc crystal structure and including nitrogen,
the second underlayer is made of is made of Cr or a Cr alloy each having a bcc crystal structure or, Cr or a Cr alloy each including nitrogen, and
the first underlayer has a nitrogen content larger than that of the second underlayer, and the first underlayer has a thickness in a range of 0.5 nm to 6.0 nm.

21. A magnetic disk comprising:
a substrate;
a seed layer, provided on the substrate, and made of a material selected from a group consisting of AlRu, NiAl and FeAl;
a first underlayer, provided on the seed layer, and made of Cr or a Cr alloy each having a bcc crystal structure formed in a gas atmosphere including nitrogen gas in a range of 0.01 vol.% to 0.50 vol.%;

a second underlayer, provided on the first underlayer, and made of Cr or a Cr alloy each having a bcc crystal structure formed in a gas atmosphere including nitrogen gas in a range of 0.00 vol.% to 0.10 vol.%;
a first magnetic layer provided on the second underlayer;
a nonmagnetic coupling layer provided on the first magnetic layer; and
a second magnetic layer provided on the nonmagnetic coupling layer,
wherein the first and second magnetic layers are exchange-coupled, and have magnetizations that are mutually antiparallel in a state where no external field is applied to the magnetic recording medium, and the first underlayer has a thickness in a range of 0.5 nm to 6.0 nm.

22. A magnetic storage apparatus comprising:
at least one magnetic recording medium; and
a head configured to record information on and to reproduce information from the magnetic recording medium,
said magnetic recording medium comprising:
a substrate;
a first underlayer provided on the substrate;
a first magnetic layer provided on the first underlayer;
a nonmagnetic coupling layer provided on the first magnetic layer; and
a second magnetic layer provided on the nonmagnetic coupling layer,
wherein the first and second magnetic layers are exchange-coupled, and have magnetizations that are mutually antiparallel in a state where no external field is applied to the magnetic recording medium, and
the first underlayer is made of Cr or a Cr alloy each having a bcc crystal structure and including nitrogen, and has a thickness in a range of 0.5 nm to 6.0 nm.

23. A magnetic storage apparatus comprising:
at least one magnetic recording medium; and
a head configured to record information on and to reproduce information from the magnetic recording medium,
said magnetic recording medium comprising:
a substrate;
a first underlayer provided on the substrate;
a second underlayer provided on the first underlayer;
a first magnetic layer provided on the second underlayer;
a nonmagnetic coupling layer provided on the first magnetic layer; and
a second magnetic layer provided on the nonmagnetic coupling layer,
wherein the first and second magnetic layers are exchange-coupled, and have magnetizations that are mutually antiparallel in a state where no external field is applied to the magnetic recording medium,
the first underlayer is made of Cr or a Cr alloy each having a bcc crystal structure and including nitrogen, and wherein the first underlayer has a thickness in a range of 0.5 nm to 6.0nm,
the second underlayer is made of is made of Cr or a Cr alloy each having a bcc crystal structure or, Cr or a Cr alloy each including nitrogen, and
the first underlayer has a nitrogen content larger than that of the second underlayer.

24. A magnetic storage apparatus comprising:
at least one magnetic disk; and
a head configured to record information on and to reproduce information from the magnetic disk, said magnetic disk comprising:
a substrate;
a seed layer, provided on the substrate, and made of a material selected from a group consisting of AlRu, NiAl and FeAl;
a first underlayer, provided on the seed layer, and made of Cr or a Cr alloy each having a bcc crystal structure formed in a gas atmosphere including nitrogen gas in a range of 0.01vol.% to 0.50vol.%;
a second underlayer, provided on the first underlayer, and made of Cr or a Cr alloy each having a bcc crystal structure formed in a gas atmosphere including nitrogen gas in a range of 0.00vol.% to 0.10vol.%;
a first magnetic layer provided on the second underlayer;
a nonmagnetic coupling layer provided on the first magnetic layer; and
a second magnetic layer provided on the nonmagnetic coupling layer,
wherein the first and second magnetic layers are exchange-coupled, and have magnetizations that are mutually antiparallel in a state where no external field is applied to the magnetic disk, and
the first underlayer has a thickness in a range of 0.5nm to 6.0nm.

* * * * *